United States Patent
Gruener et al.

(10) Patent No.: US 11,230,643 B2
(45) Date of Patent: *Jan. 25, 2022

(54) PEARLESCENT PIGMENTS BASED ON FINE AND THIN SUBSTRATES

(75) Inventors: Michael Gruener, Auerbach (DE); Ulrich Schmidt, Hersbruck (DE); Günter Kaupp, Neuhaus (DE); Peter Krueger, Lauf (DE); Jens Depner, Velden (DE); Katrin Steinbach, Nuremberg (DE); Ralph Schneider, Lauf (DE); Frank Henglein, Nuremberg (DE)

(73) Assignee: ECKART GMBH, Hartenstein (DE)

( * ) Notice: Subject to any disclaimer, the term of this patent is extended or adjusted under 35 U.S.C. 154(b) by 848 days.

This patent is subject to a terminal disclaimer.

(21) Appl. No.: 12/937,818

(22) PCT Filed: Apr. 15, 2009

(86) PCT No.: PCT/EP2009/002757
§ 371 (c)(1),
(2), (4) Date: Dec. 1, 2010

(87) PCT Pub. No.: WO2009/127406
PCT Pub. Date: Oct. 22, 2009

(65) Prior Publication Data
US 2011/0064779 A1  Mar. 17, 2011

(30) Foreign Application Priority Data
Apr. 15, 2008 (EP) .................... 08007357

(51) Int. Cl.
*A61K 8/11* (2006.01)
*C09C 1/00* (2006.01)

(52) U.S. Cl.
CPC .......... *C09C 1/0015* (2013.01); *C09C 1/0021* (2013.01); *C01P 2004/61* (2013.01); *C01P 2006/60* (2013.01); *C09C 2200/102* (2013.01); *C09C 2200/1004* (2013.01); *C09C 2200/301* (2013.01); *C09C 2200/401* (2013.01); *C09C 2200/405* (2013.01)

(58) Field of Classification Search
None
See application file for complete search history.

(56) References Cited

U.S. PATENT DOCUMENTS

| | | | |
|---|---|---|---|
| 3,861,946 A | 1/1975 | Waitkins | |
| 5,266,107 A | 11/1993 | Hoffman | |
| 5,741,355 A | 4/1998 | Yamamoto | |
| 6,019,831 A | 2/2000 | Schmidt et al. | |
| 6,294,592 B1 | 9/2001 | Herrmann et al. | |
| 6,689,205 B1 | 2/2004 | Bruckner et al. | |
| 7,413,599 B2 | 8/2008 | Henglein et al. | |
| 7,678,449 B2 | 3/2010 | Jones | |
| 7,699,927 B2 | 4/2010 | Henglein et al. | |
| 8,017,236 B2 | 9/2011 | Johnson et al. | |
| 8,500,901 B2 | 8/2013 | Rueger et al. | |
| 9,815,970 B2 | 11/2017 | Jones et al. | |
| 10,253,191 B2 | 4/2019 | Shimizu et al. | |
| 2003/0147819 A1 | 8/2003 | Watanabe | |
| 2004/0096579 A1 | 5/2004 | Kil-Wan et al. | |
| 2005/0013934 A1 | 1/2005 | Xiong et al. | |
| 2005/0176580 A1 | 8/2005 | Osaka et al. | |
| 2005/0176850 A1* | 8/2005 | Schmidt et al. | ............. 523/160 |
| 2006/0042508 A1 | 3/2006 | Henglein et al. | |
| 2006/0042509 A1 | 3/2006 | Henglein et al. | |
| 2006/0111466 A1 | 5/2006 | Bujard et al. | |
| 2006/0223910 A1 | 10/2006 | Bagala, Sr. | |
| 2007/0199478 A1 | 8/2007 | Schlegl et al. | |
| 2008/0017075 A1 | 1/2008 | Cao et al. | |
| 2008/0017076 A1 | 1/2008 | Noguchi | |
| 2008/0181921 A1 | 7/2008 | DeLuca | |
| 2009/0258251 A1 | 10/2009 | Abe et al. | |
| 2009/0311209 A1 | 12/2009 | Bujard | |
| 2010/0083872 A1 | 4/2010 | Kitamura et al. | |
| 2010/0255047 A1 | 10/2010 | Anselmann et al. | |
| 2010/0297045 A1 | 11/2010 | Kaupp et al. | |
| 2010/0298469 A1 | 11/2010 | Kaupp et al. | |

(Continued)

FOREIGN PATENT DOCUMENTS

| | | | |
|---|---|---|---|
| DE | 19618569 A1 | 11/1997 | |
| DE | 19727767 A1 | 1/1999 | |

(Continued)

OTHER PUBLICATIONS

Horiba (https://www.horiba.com/fileadmin/uploads/Scientific/eMag/PSA/Guidebook/pdf/PSA_Guidebook.pdf (2017)) (Year: 2017).*
C. Schmidt, et al.,"Optical Physics of Synthetic Interference Pigments," Kontakte (Darmstadt) 1992 (2), pp. 15-24.
Franz Hofmeister, et al., "Reflectance Measurements of Interference, Aluminum, and Masstone Pigments," Research and Development section, farbe+lack, vol. 95, Aug. 1989, pp. 1-9 (in German together with English translation).
International Search Report dated Jul. 22, 2009, issued in corresponding international application No. PCT/EP2009/002757.
European Search Report dated Aug. 19, 2008, issued in corresponding European priority application No. EP 08007357.0.
Notice of Reasons for Rejection dated Jan. 29, 2013 in corresponding Japanese Patent Application No. 2011-504373 (with English language translation).
Extract taken from www.shimadzu.com/an/powder/support/practice/p01/lesson21.html, 2016 (2 pages).

(Continued)

*Primary Examiner* — Jake M Vu
(74) *Attorney, Agent, or Firm* — Fitch, Even, Tabin & Flannery LLP

(57) ABSTRACT

Pearlescent pigments including a largely transparent platelet-shaped substrate having a density $\rho_S$ and at least one optically active coating having a density $\rho_M$, the substrate having an average size $d_{50}$ of 3 to 8 μm and an average height $h_S$ of 40 to 110 nm. The disclosure further relates to a method for producing the pearlescent pigments, and also to the use thereof.

25 Claims, 5 Drawing Sheets

(56) References Cited

U.S. PATENT DOCUMENTS

| | | | |
|---|---|---|---|
| 2011/0064779 | A1 | 3/2011 | Gruener et al. |
| 2011/0226161 | A1 | 9/2011 | Schumacher et al. |
| 2011/0259243 | A1 | 10/2011 | Schumacher et al. |
| 2011/0265689 | A1 | 11/2011 | Schumacher et al. |
| 2011/0265690 | A1 | 11/2011 | Schumacher et al. |
| 2012/0027830 | A1 | 2/2012 | Nakamura et al. |
| 2016/0137847 | A1 | 5/2016 | Rueger |

FOREIGN PATENT DOCUMENTS

| | | | |
|---|---|---|---|
| DE | 10315775 | A1 | 10/2004 |
| DE | 102004041592 | A1 | 3/2006 |
| DE | 60318235 | T2 | 12/2008 |
| DE | 102007041027 | A1 | 3/2009 |
| EP | 0723997 | B1 | 6/1999 |
| EP | 1072651 | A | 1/2001 |
| EP | 1564261 | A | 8/2005 |
| EP | 1564261 | A2 | 8/2005 |
| EP | 1572812 | A1 | 9/2005 |
| EP | 1595921 | A | 11/2005 |
| EP | 1682622 | A1 | 7/2006 |
| EP | 1727864 | A1 | 12/2006 |
| EP | 1554345 | B1 | 12/2007 |
| EP | 2093260 | A1 | 8/2009 |
| EP | 2649134 | A1 | 10/2013 |
| EP | 2688961 | A1 | 1/2014 |
| EP | 2727967 | A1 | 5/2014 |
| EP | 2917285 | A1 | 9/2015 |
| EP | 3010980 | A1 | 4/2016 |
| EP | 2531563 | B1 | 11/2016 |
| EP | 3305858 | A1 | 4/2018 |
| EP | 2935465 | B1 | 8/2018 |
| JP | 09-255891 | | 9/1997 |
| JP | 2000-281932 | | 10/2000 |
| JP | 2001262036 | A | 9/2001 |
| JP | 200238051 | A | 2/2002 |
| JP | 2002-294098 | | 10/2002 |
| JP | 2003080836 | A | 3/2003 |
| JP | 2005314649 | A | 11/2005 |
| JP | 2006-124524 | | 5/2006 |
| JP | 2006-527779 | | 12/2006 |
| JP | 2006-527779 | A | 12/2006 |
| JP | 2007-126643 | | 5/2007 |
| JP | 2008-510866 | | 4/2008 |
| JP | 200888317 | A | 4/2008 |
| JP | 2008-546880 | | 12/2008 |
| JP | 2008-546880 | A | 12/2008 |
| JP | 2011516706 | A | 5/2011 |
| WO | 2002/090448 | A3 | 11/2002 |
| WO | WO 02/090448 | A | 11/2002 |
| WO | WO 2004/07816 | A2 | 1/2004 |
| WO | WO 2004/087816 | A2 | 10/2004 |
| WO | 2006021388 | A1 | 3/2006 |
| WO | 2007/054379 | A1 | 5/2007 |
| WO | WO 2007/054379 | A | 5/2007 |
| WO | 2009010288 | A2 | 1/2009 |
| WO | 2009030293 | A2 | 3/2009 |
| WO | WO 2009/103322 | A1 | 8/2009 |
| WO | WO 2009/127406 | A1 | 10/2009 |
| WO | 2010113899 | A1 | 10/2010 |

OTHER PUBLICATIONS

Extract taken from www.aimsizer.com/faqs-What-is-D50.html, (1 page), obtained by applicants on Oct. 20, 2016.

BASF Brochure for Glacier™ Frost White Effect Pigment, (6 pages), obtained by applicants on Oct. 20, 2016.

G. Pfaff, et al., Special Effect Pigments—Technical Basics Applications, 2nd Revised Edition, 2008, (pp. 40-41).

Technical Data Sheet No. 035623ZZ5 from Eckart GmbH for the product SYMIC E001, Apr. 24, 2015, (1 page).

Coloring the Cosmetic World: Using Pigments in Decorative Cosmetic Formulation, 2012, (pp. 144-145 and 150-151).

"Iron Oxides," 21 CFR 73.2250, revised as of Apr. 1, 2005.

"Cilas 1064," brochure, accessed at http://www.es-france.com/pdf/1064_us_doctech.pdf, accessed Jul. 31, 2017.

Google patent machine translation, Kaupp et al. WO 2009/103322 A1, downloaded Sep. 18, 2017.

Young Cheol Ryu et al., "Effect of substrate on the phase transformation of $TiO_2$ in pearlescent pigment," Journal of Industrial and Engineering Chemistry, 14, (2008), pp. 213-218.

Horiba Scientific, "Understanding Particle Size Distribution Calculations," accessed at http://www.horiba.com/us/en/scientific/products/particle-characterization/education/general-information/data-interpretation/understanding-particle-size-distribution-calculations/, on Aug. 6, 2015.

Bohumil Dočekal et al., "Determination of trace impurities in titanium dioxide by direct solid sampling eletrothermal atomic absorption spectrometry," Spectrochimica Acta Part B 62, (2007), pp. 304-308.

Translation of JP 2000-281932 published Oct. 10, 2000, accessed in opposition proceedings of EB2123721B1 from EPO.

SunShine color Effect Pigments, Maprecos 2013 Catalogue, front matter and pp. 63-64, accessed online at http://www.maprecos.com/wp-content/uploads/2013/01/CATALOGUE-2013-VERSION-ELECTRONIQUE.pdf on Jul. 12, 2013.

Gerhard Pfaff et al., "Angle-Dependent Optical Effects Driving from Submicron Structures of Films and Pigments," Chemistry Reviews, 99, (1999), pp. 1963-1981.

Extract relation to "Color Additives and Cosmetics" taken from U.S. Food and Drug Association website: https://www.fda.gov/forindustry/coloradditives/coloradditivesinspecificproducts/incosmetics/ucm110032.thm with effective update date of Apr. 29, 2007.

BASF Brochure for GlacierTM Frost White, "The whiter white effect pigment," currently available at: https://product-finder-basf.com/group/corporate/product-finder/de/literature-document:/Brand+Glacier-Brochure--The+whiter+white+effect+pigment+GlacierTM+Frost+White-English.pdf of Nov. 14, 2007.

Excerpt (pp. 40-41) from Pfaff G. et al., Special Effects Pigments—Technical Basics and Applications, 2nd revised edition, 2008.

International Search Report dated Dec. 21, 2010, issued in corresponding International Application No. PCT/EP2010/EP2010/003740 (with English language translation).

Nancy M. Hepp et al., "Determination of total lead in lipstick: Development and validation of a microwave-assisted digestion, inductively coupled plasma-mass spectrometric method," J. Cosmet. Sci., 60, Jul./Aug. 2009, pp. 405-414.

R.C. Weast, et al., Handbook of Chemistry and Physics, 45th Edition (1964-1965).

Declaration of Steven Jones dated Jul. 24, 2020.

Wikipedia, "Standard Deviation," dated May 29, 2017.

\* cited by examiner

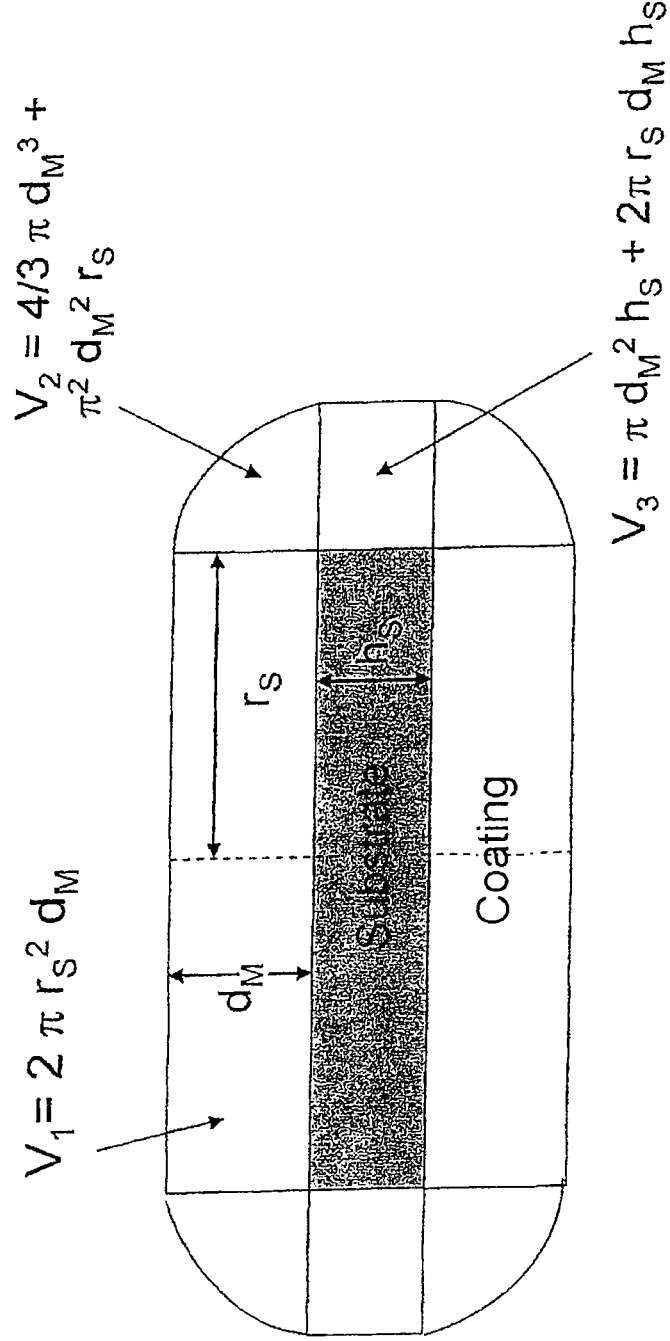
Fig. 1: Substrate S and coating M

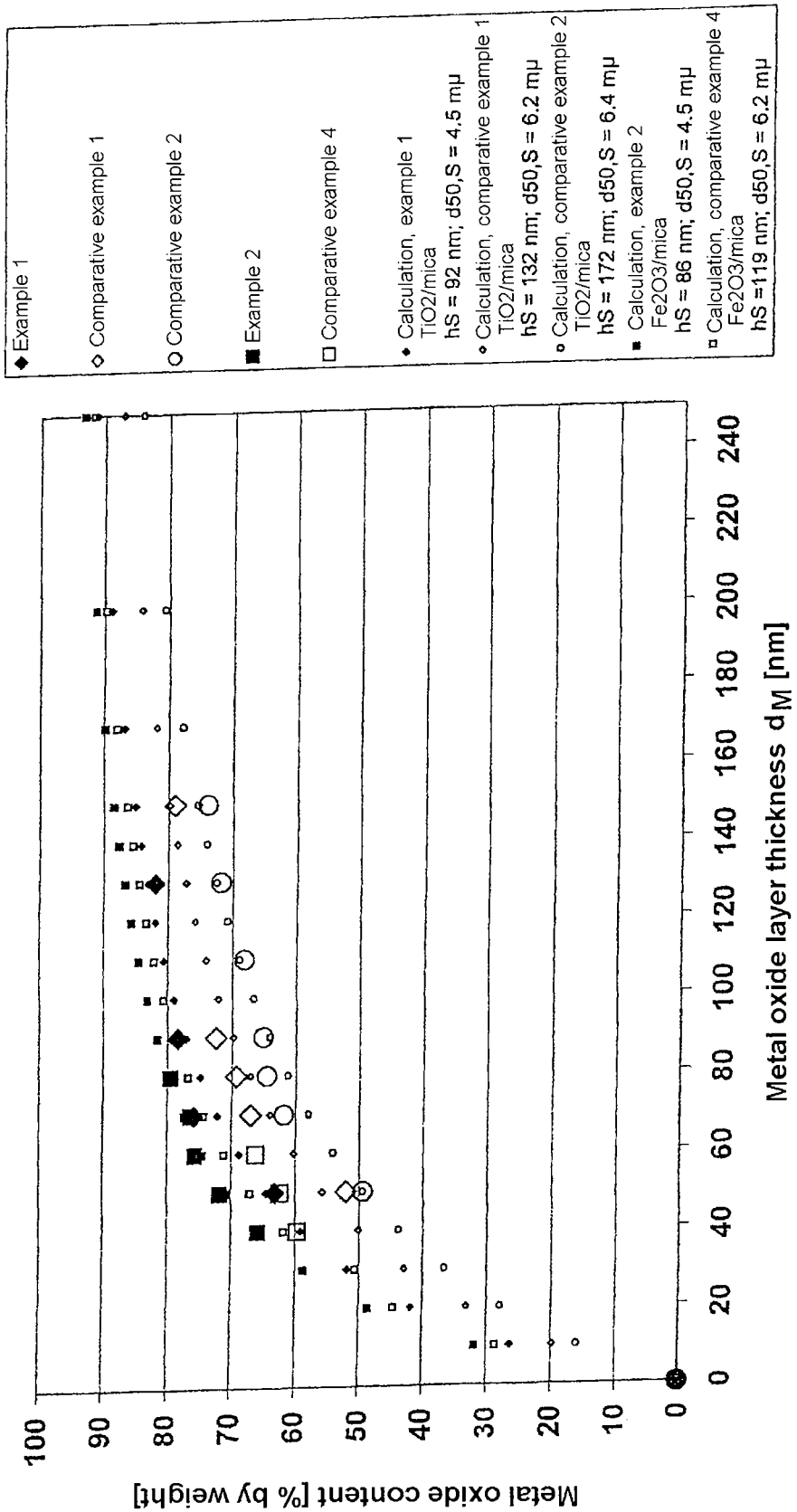
Fig. 2: Experimental results and "Fitcurve" series

PEARLESCENT PIGMENTS BASED ON FINE AND THIN SUBSTRATES

CROSS REFERENCE TO RELATED APPLICATIONS

The present application is a 35 U.S.C. § 371 National Phase conversion of PCT/EP2009/002757, filed Apr. 15, 2009, which claims benefit of European Application No. 08007357.0, filed Apr. 15, 2008, the disclosure of which is incorporated herein by reference. The PCT International Application was published in the German language.

TECHNICAL FIELD

The invention relates to pearlescent pigments, to their use and preparation, and to coating compositions which comprise the pearlescent pigments of the invention.

BACKGROUND

WO 2007/054379 A1 describes pearlescent pigments based on very thin platelet-shaped glass substrates. The platelet-shaped glass substrates, according to the examples of WO 2007/054379 A1, have a greater diameter of more than 20 µm and less than 100 µm.

WO 02/090448 A2 describes effect pigments which are based on platelet-shaped glass substrates having a thickness of ≤1.0 µm and more particularly having a thickness of 20 to 400 nm. The platelet-shaped glass substrates, according to the examples of WO 02/090448 A2, have a diameter of 10 to 40 µm.

In EP 1 072 651 A1, pigments are described that are based on thin flakes having an average particle size of 0.5-10 µm, which are coated first with spherical $SiO_2$ particles and thereafter with ultrafine titanium dioxide particles.

All of the major manufacturers possess fine pearlescent pigments in their offering. Examples thereof are Prestige Soft Pigmente® (Eckart GmbH) or Mearlin Micro® (BASF Catalysts).

The company SunChemical, under the product name "SpectraFlex® Focus", sells pearlescent pigments based on $Al_2O_3$ flakes that are coated with $TiO_2$. The pigments have particle sizes of 3-18 µm.

One of the uses to which the aforementioned effect pigments are put is that of pigmenting cosmetics. Disadvantageously, these known effect pigments do not exhibit sufficient soft focus—that is, within a cosmetic, they do not have the capacity to provide satisfactory concealment of creases or irregularities in the skin.

There exists, accordingly, a need for improved effect pigments. A particular desire is for provision of effect pigments having improved soft focus and a pleasant feeling on the skin. These effect pigments shall combine the properties of conventional pearlescent pigments, such as interference, deep gloss, and coloredness where appropriate, with an additional soft-focus effect.

BRIEF DESCRIPTION OF THE DRAWINGS

FIG. 1 is a model outlining calculation of volume of a coating material.

FIG. 2 is a graphic representation of the metal oxide content against layer thickness for certain examples and comparative examples described herein.

Figure 3A:
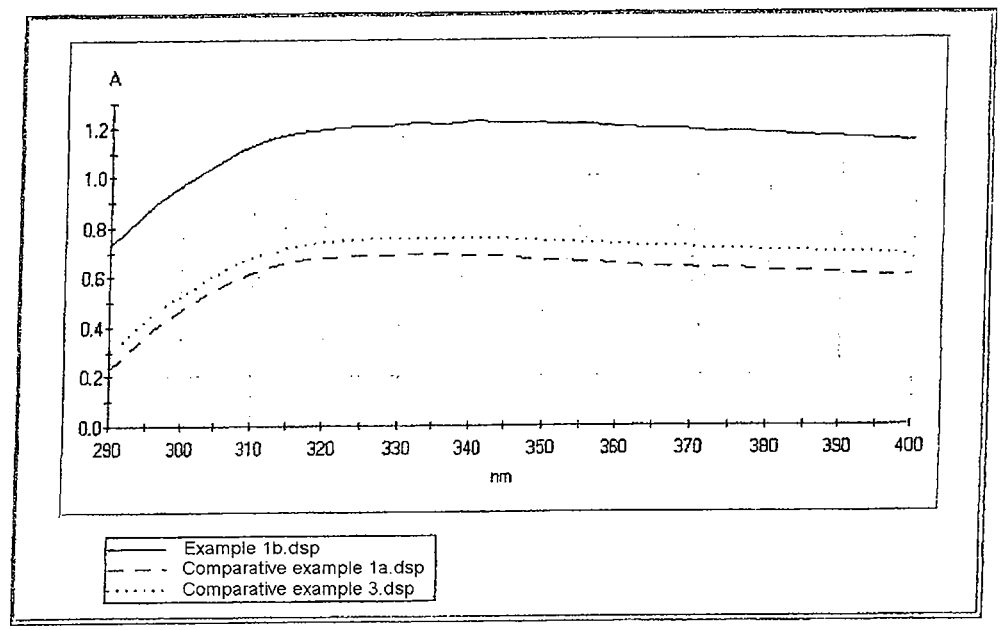
FIGS. 3a and 3b show the absorption spectra in the wavelength range from 290 to 400 nm for certain examples and certain comparative examples described herein.

The effect pigments, lastly, ought to have good opacity with strong haze effect and also, at the same time, an intense interference color.

SUMMARY

The object on which the invention is based is achieved through the provision of pearlescent pigments comprising a largely transparent platelet-shaped substrate having a density $\rho_S$ and at least one optically active coating having a density $\rho_M$, the substrate having an average size $d_{50}$ of 3 to 8 µm and an average height $h_S$ of 40 to 110 nm.

Preferred developments of the pearlescent pigments of the invention are specified in dependent claims 2 to 16.

The object on which the invention is based is also achieved by a method for producing the pearlescent pigments of the invention, which comprises the following steps:
a) classifying the largely transparent substrate, to give a substrate having an average height $h_S$ of 40 to 110 nm, preferably from 40 to below 100 nm,
b) coating the classified substrate with an optically active, preferably high-index, layer, to give a pearlescent pigment having an average size $d_{50}$ of 3 to 8 µm.

Furthermore, the object of the invention is also achieved by the use of the pearlescent pigments of the invention in paints, printing inks, cosmetics, plastics, glass, enamel, glazes or ceramic.

The object of the invention is further achieved by the use of the pearlescent pigments of the invention as soft-focus pigments.

The object on which the invention is based is also achieved through provision of a coating composition, more particularly a cosmetic product, which comprises the pearlescent pigments of the invention.

Lastly, the object of the present invention is achieved through provision of a method for determining the average layer thickness $h_S$ of a platelet-shaped substrate of an effect pigment comprising a platelet-shaped substrate having a density $\rho_s$ and at least one optically active coating having a density $\rho_M$, in accordance with the following formula:

$$h_S = \frac{\frac{4d_M^3}{3r_S^2} + \frac{\pi d_M^2}{r_S} + 2 \cdot d_M}{\frac{\delta_S}{\rho_M \cdot \left(\frac{100}{c_M} - 1\right)} - \left(\frac{d_M}{r_S}\right)^2 - 2 \cdot \frac{d_M}{r_S}}$$

where $d_M$ is the ascertained average layer thickness of the high-index layer and/or of the semitransparent metal coating, $r_S$ is the ascertained average radius of the substrate,
$\rho_S$ is the ascertained density of the substrate and $\rho_M$ is the ascertained density of the optically active coating and cm is the ascertained weight fraction in percent of the optically active coating, based on the total weight of substrate and optically active coating. The average layer thickness $h_S$ is then determined by calculation from the determined parameters $d_M$, $r_S$, $\rho_S$, and $\rho_M$.

DETAILED DESCRIPTION

The terms "coating" and "layer" are used interchangeably in the context of the present invention.

The inventors have surprisingly found that pearlescent pigments based on largely transparent platelet-shaped substrates have a good soft focus and a good feeling on the skin when the $d_{50}$ value of the size and the average height $h_S$ are each located within the range of values indicated above.

The pearlescent pigments of the invention, then, have a substrate with an extraordinarily small diameter and an extraordinarily small substrate thickness. It has surprisingly emerged that, when these substrates are used for producing pearlescent pigments, pearlescent pigments are obtained that have a good soft focus and a pleasant feeling on the skin.

At the same time, the pearlescent pigments of the invention, in spite of the small diameter, have strong interference colors, and so the pearlescent pigments of the invention are especially suitable for the coloring of cosmetics.

It has also emerged, surprisingly, that the pearlescent pigments of the invention, when used in cosmetics, adhere more reliably to the base, such as skin, eyelids, hair, lashes, fingernails and/or toenails, despite the area of contact with the base being smaller because of the smaller diameter of the pearlescent pigment.

In light of this surprising result in the context of adhesion to the base, it is now supposed that, with larger effect pigments, the pigments do not lie on the base over their full area, and hence sections of these larger effect pigments "stick out" above the base and, under exposure to mechanical forces, as for example on blinking or muscular movements, or under the influence of liquids, such as water or bodily secretions, such as perspiration, for example, larger effect pigments are detached more readily from the base. A more mature or older skin, in particular, has relatively greater irregularities, at which the pearlescent pigments of the invention are presumably able to adhere over their full area, or with a larger relative area fraction, than—presumably—larger effect pigments are able to achieve.

In the case of hairs or lashes, which typically have a thickness in the range from 40 µm to 120 µm, the pearlescent pigments of the invention, taking into account the curvature of the hairs as well, lie presumably largely against the hairs or lashes over the full area of the pigments. Surprisingly, therefore, the pearlescent pigments of the invention have a very good hold to hairs and lashes, and so do not drop off during combing or during entanglement of hairs, as in the wind, for example. If the pearlescent pigments were to drop off it would be extremely deleterious, since on the one hand the hairs or lashes would no longer have the desired uniform coloration, and on the other hand the visual effect produced would be that of dandruff, as a result, for example, of deposition of the dropped-off pearlescent pigments in the shoulder region of a dress or suit.

By an optically active coating is meant in accordance with the invention, for example, semitransparent metal layers. The layer thickness of the semitransparent metal layers is situated typically in a range from 5 to 30 nm, preferably from 10 to 25 nm. Layer thicknesses from a range from 20 to 25 nm as well have proven very suitable. Furthermore, by an optically active coating is meant, in accordance with the invention, metal oxide layers, preferably high-index metal oxide layers. The refractive index of high-index metal oxide layers is preferably above 1.8, more preferably above 2.0. Refractive indices of more than 2.2 or more than 2.6 as well have proven very suitable. The layer thickness of the high-index metal oxide layer is situated preferably in a range between 10 and 300 nm, more preferably between 20 and 200 nm, more preferably still between 50 and 150 nm. Instead of high-index metal oxides it is also possible to use other high-index materials, examples being metal sulfides, metal selenides or metal nitrides, the layer thicknesses preferably exhibiting the ranges specified for the high-index metal oxides.

According to one very preferred embodiment of the invention, the optically active coating is one (number: 1) high-index metal oxide layer.

It will be appreciated that more than one high-index metal oxide layer may also be applied to the substrate. In the case of this variant, it is preferred for there to be disposed, between two high-index metal oxide layers, at least one low-index layer, with a refractive index preferably of less than 1.8, more preferably of less than 1.6.

As a low-index layer it is preferred to use low-index metal oxide layers, more particularly silicon oxide and/or aluminum oxide. Low-index layers used are preferably layers of silicon oxide, preferably $SiO_2$, aluminum oxide, preferably $Al_2O_3$, AlOOH, boron oxide, $MgF_2$ or mixtures thereof.

The substrate has an average size $d_{50}$ of 3 to 8 µm, preferably of 3.1 to 7 µm, more preferably of 3.2 to 6.0 µm, and with particular preference of 3.3 to below 5.0 µm.

Above an average size $d_{50}$ of 8 µm, the advantageous properties of the pearlescent pigments of the invention are no longer apparent.

If the average size is below 3 µm, the layer thickness of the substrates is very small. In this case, the coating with a high-index material and/or with a semitransparent metal layer that is necessary in order to achieve an interference effect is almost impossible to carry out at an economically tenable expense.

By the average size $d_{50}$ is meant, in the context of this invention, the $d_{50}$ value of the cumulative undersize curve of the volume-averaged size distribution function, of the kind obtained by laser diffraction methods. In this case, preferably, the size distribution curve is determined using an instrument from the company Cilas (instrument: Cilas 1064). The $d_{50}$ value indicates that 50% of the substrates have a diameter which is less than or equal to the specified value, 6 µm, for example.

The term "cumulative undersize curve" used in accordance with the invention is also referred to as "cumulative frequency distribution". These two terms can therefore be used interchangeably.

Furthermore, the substrate of the pearlescent pigments of the invention has an average height (layer thickness) $h_S$ of 40 to 110 nm, preferably of 40 to below 100 nm, more preferably 40 to 95 nm, more preferably from 45 to 94 nm, and with particular preference from 50 to 90 nm.

Below a layer thickness of 40 nm, the pigments are mechanically too fragile, and the coating times with metal or high-index metal oxide last too long, owing to the extremely high specific surface area, to be economically tenable. By the specific surface area is meant the surface area per unit weight. Since the layer thickness of the substrates of the pearlescent pigments of the invention is extremely low, these substrates have a very large surface area per unit weight by comparison with conventional substrates.

Above a layer thickness of 110 nm, the advantages of the invention are barely still present.

The standard deviation for the height $h_S$ is preferably in a range from 25% to 80%, more preferably from 30% to 60%.

According to one preferred variant of the invention, the pearlescent pigments have a size distribution with a $d_{90}$ value of 7.0 to 11.0 μm, more preferably of 7.5 μm to 10.5 μm.

The pearlescent pigments of the invention, accordingly, constitute a new class of pearlescent pigments in the form of extremely fine pearlescent pigments which are based on a largely transparent substrate having a very low average size and a very low average layer thickness. Pigments of this kind exhibit an unusually high scattered-light fraction, owing to the high proportion of edges relative to the area. In paint applications, for example, this results in a high haze effect. Nevertheless, surprisingly, the pearlescent pigments of the invention display an intense interference color, despite the fact that the interference color is usually prevented or greatly attenuated by scattering effects.

The pearlescent pigments of the invention have at least one optically active coating, preferably in the form of a high-index coating, preferably high-index metal oxide layer, and/or a semitransparent metal coating having a density $\rho_M$. By the density $\rho_M$ is meant the density of the optically active coating. Accordingly, in the case of a metal oxide layer, $\rho_M$ is the density of the metal oxide layer and, in the case of a semitransparent metal layer, $\rho_M$ is the density of the semitransparent metal layer.

In the context of this invention, pigments based on largely transparent substrates and a semitransparent metal layer are also referred to as pearlescent pigments. The pearlescent pigments of the invention preferably have an interference effect.

Termed or used as largely transparent platelet-shaped substrates are, preferably, substrates of natural mica, talc, sericite, kaolin, synthetic mica, glass platelets, $SiO_2$ platelets, $Al_2O_3$ platelets, graphite platelets, polymeric platelets or mixtures thereof. Particularly preferred in this context are natural mica, synthetic mica, $SiO_2$ platelets, glass platelets (which are also referred to as glass flakes) and/or $Al_2O_3$ platelets. Very much preferred are natural mica, synthetic mica and/or glass platelets (glass flakes).

In one preferred embodiment, the pearlescent pigments of the invention have at least one high-index coating. The high-index coating preferably has a refractive index $n_M>2.0$ and more preferably a refractive index $n_M>2.2$.

With particular preference the high-index coating has or is a metal oxide layer and/or a metal hydroxide layer and/or a metal oxide hydrate layer.

High-index layers used are preferably high-index metal oxides, metal hydroxides and/or metal oxide hydrates. Metal oxides used are preferably metal oxides of the group consisting of titanium oxide, iron oxide, cerium oxide, chromium oxide, tin oxide, zirconium oxide, cobalt oxide, and mixtures thereof. Instead of or in addition to the oxides specified above, it will be appreciated that the corresponding metal hydroxides and/or metal oxide hydrates can also be used.

The titanium oxide in this context may be selected from the group consisting of rutile, anatase, and pseudobrookite. The titanium oxide is preferably present as $TiO_2$ in the rutile modification.

The iron oxide is preferably selected from the group consisting of hematite, goetite and/or magnetite. The iron oxide is preferably present as $Fe_2O_3$ (hematite) and/or $Fe_3O_4$ (magnetite).

Particular preference is given to $TiO_2$ and $Fe_2O_3$ and also mixtures and combinations thereof. In mixtures of these oxides, the $TiO_2$ is present in a pseudobrookite modification or alternatively as ilmenite.

$TiO_2$ coated pigments allow the provision of silver shades. These pigments are extremely advantageous for what is called the "immediate whitening" effect. This term comprehends cosmetic skin formulations which impart a whiter appearance to the skin. To date, $TiO_2$ pigments have usually been used to achieve this immediate whitening effect. Disadvantageously, the conventional $TiO_2$ pigments act like heavy makeup. Because of the combination of existing gloss and the special fine division, the pigments of the invention permit a more natural effect.

In the case of iron oxides as high-index coating, the pearlescent pigments of the invention can be employed advantageously in hair formulations in particular. Pigments of this kind support the natural hair color and nevertheless, on account of their fineness, do not act as "dandruff". This applies in this case particularly to dark hair, preferably brunette hair. Blonde hair as well can be supported or boosted in its coloring by cosmetic hair products which comprise "golden" or "beige" pearlescent pigments of the invention. Moreover, hair colored blue or green can be supported in its coloring by correspondingly colored pearlescent pigments.

As an optically active coating or layer it is also possible, instead of or in addition to the one or more high-index metal oxide layers, for one or more semitransparent metal layers to be applied. In order to produce the semitransparent metal layers, it is preferred to apply one or more metals selected from the group consisting of silver, gold, aluminum, iron, magnesium, chromium, copper, zinc, tin, manganese, cobalt, titanium, tantalum, molybdenum, and mixtures and alloys thereof.

According to one preferred variant of the invention, the pearlescent pigments have a metal oxide layer of $TiO_2$ and a substrate of mica. The mica may be synthetic or natural mica.

Furthermore, the relationship between the $TiO_2$ content in % by weight, based on the total weight of $TiO_2$ and mica, and the average layer thickness of the $TiO_2$ coating is preferably as follows:

a $TiO_2$ content of 47.5-62% by weight with an average $TiO_2$ layer thickness of above 20 to 30 nm;
a $TiO_2$ content of 58-74% by weight with an average $TiO_2$ layer thickness of above 35 to 45 nm;
a $TiO_2$ content of 63-78% by weight with an average $TiO_2$ layer thickness of above 45 to 55 nm;
a $TiO_2$ content of 67-82% by weight with an average $TiO_2$ layer thickness of above 55 to 65 nm;
a $TiO_2$ content of 70-85% by weight with an average $TiO_2$ layer thickness of above 65 to 75 nm;
a $TiO_2$ content of 73.5-86.5% by weight with an average $TiO_2$ layer thickness of above 75 to 85 nm;
a $TiO_2$ content of 75-88% by weight with an average $TiO_2$ layer thickness of above 85 to 95 nm;
a $TiO_2$ content of 76.5-89% by weight with an average $TiO_2$ layer thickness of above 95 to 105 nm;
a $TiO_2$ content of 78.5-90% by weight with an average $TiO_2$ layer thickness of above 105 to 115 nm;
a $TiO_2$ content of 80-91% by weight with an average $TiO_2$ layer thickness of above 115 to 125 nm;
a $TiO_2$ content of 81.5-92% by weight with an average $TiO_2$ layer thickness of above 125 to 135 nm;
a $TiO_2$ content of 83-92.5% by weight with an average $TiO_2$ layer thickness of above 135 to 145 nm;
a $TiO_2$ content of 84-93% by weight with an average $TiO_2$ layer thickness of above 145 to 155 nm;
a $TiO_2$ content of 85-93% by weight with an average $TiO_2$ layer thickness of above 155 to 165 nm;

a $TiO_2$ content of 86-93.5% by weight with an average $TiO_2$ layer thickness of above 165 to 175 nm;
a $TiO_2$ content of 87-94% by weight with an average $TiO_2$ layer thickness of above 175 to 185 nm;
a $TiO_2$ content of 87.5-94% by weight with an average $TiO_2$ layer thickness of above 185 to 195 nm;
a $TiO_2$ content of 88-94.5% by weight with an average $TiO_2$ layer thickness of above 195 to 205 nm;
a $TiO_2$ content of 89-95% by weight with an average $TiO_2$ layer thickness of above 205 to 215 nm.

In a further-preferred embodiment, the relationship between the $TiO_2$ content in % by weight, based on the total weight of $TiO_2$ and mica, and the average layer thickness of the $TiO_2$ coating is preferably as follows:
a $TiO_2$ content of 50.5-62% by weight with an average $TiO_2$ layer thickness of above 20 to 30 nm;
a $TiO_2$ content of 61-74% by weight with an average $TiO_2$ layer thickness of above 35 to 45 nm;
a $TiO_2$ content of 65.5-78% by weight with an average $TiO_2$ layer thickness of above 45 to 55 nm;
a $TiO_2$ content of 69.5-82% by weight with an average $TiO_2$ layer thickness of above 55 to 65 nm;
a $TiO_2$ content of 72.5-85% by weight with an average $TiO_2$ layer thickness of above 65 to 75 nm;
a $TiO_2$ content of 75-86.5% by weight with an average $TiO_2$ layer thickness of above 75 to 85 nm;
a $TiO_2$ content of 77.5-88% by weight with an average $TiO_2$ layer thickness of above 85 to 95 nm;
a $TiO_2$ content of 79-89% by weight with an average $TiO_2$ layer thickness of above 95 to 105 nm;
a $TiO_2$ content of 80.5-90% by weight with an average $TiO_2$ layer thickness of above 105 to 115 nm;
a $TiO_2$ content of 82-91% by weight with an average $TiO_2$ layer thickness of above 115 to 125 nm;
a $TiO_2$ content of 83-92% by weight with an average $TiO_2$ layer thickness of above 125 to 135 nm;
a $TiO_2$ content of 84.5-92.5% by weight with an average $TiO_2$ layer thickness of above 135 to 145 nm;
a $TiO_2$ content of 85.5-93% by weight with an average $TiO_2$ layer thickness of above 145 to 155 nm;
a $TiO_2$ content of 86.5-93% by weight with an average $TiO_2$ layer thickness of above 155 to 165 nm;
a $TiO_2$ content of 87-93.5% by weight with an average $TiO_2$ layer thickness of above 165 to 175 nm;
a $TiO_2$ content of 88-94% by weight with an average $TiO_2$ layer thickness of above 175 to 185 nm;
a $TiO_2$ content of 88.5-94% by weight with an average $TiO_2$ layer thickness of above 185 to 195 nm;
a $TiO_2$ content of 89-94.5% by weight with an average $TiO_2$ layer thickness of above 195 to 205 nm;
a $TiO_2$ content of 89.5-95% by weight with an average $TiO_2$ layer thickness of above 205 to 215 nm.

The inventors have surprisingly found that pearlescent pigments in which the fraction of $TiO_2$ and the layer thickness per mica substrate comply with the above relations have an outstanding soft focus and are extremely suitable for use in cosmetics. These pearlescent pigments, structurally, feature a very high $TiO_2$ content per pearlescent pigment. In comparison to conventional pearlescent pigments, therefore, the fraction of $TiO_2$, based on the mica substrate, is significantly increased.

Soft-focus effect is determined for the capacity of suitable particles to provide visual reduction of unevennesses in the human skin and also of the contrast, and to effect visual smoothing of creases. Suitable particles are incorporated into cosmetic products and applied as a cosmetic layer, to the skin, for example. The soft-focus effect occurs when the incident light, after passing through the cosmetic layer, is diffusely scattered through interaction with the particles disposed on the skin's surface.

Skin defects such as "crow's feet" or creases are apparent only when they show a contrast with the background. Creases in skin act like light traps, in which the incident light is reflected within the crease until, as a result of this multiple reflection, the light is almost entirely absorbed.

In contrast to the light surrounding skin, therefore, the creases are perceived by an observer as dark, non-reflecting areas.

Through the use of highly scattering particles, such as fine spheres, for example, the light is diffusely scattered before it impinges on the skin, and so the underlying skin defects become virtually invisible.

However, in order to obtain a natural appearance, the particles must ensure not only a maximum scattering intensity but also a high level of light transmission. The effect of this is that the natural shade of the skin is not altered or concealed, i.e., the natural complexion continues to remain visible to the viewer.

In order to obtain a soft-focus effect, the particles employed must meet the following boundary conditions:
a) maximum diffuse reflection
b) minimum directed reflection
c) maximum transmission The $TiO_2$-coated pearlescent pigments of the invention are also outstandingly suitable UV absorbers. $TiO_2$ layers, as is known, are strongly UV-reflecting and therefore one of the uses of pearlescent pigments is as UV absorbers. The pearlescent pigments of the invention, by virtue of the high $TiO_2$ content (at a particular $TiO_2$ layer thickness), are particularly suitable UV absorbers. Moreover, the high edge fraction of the fine pigments may have the effect of high UV absorption.

By UV absorbers or UV absorption is meant the entire loss of light which results on passage through a layer comprising UV absorbers. This loss of light is composed of the total reflection plus the total absorption.

In accordance with one preferred development of the invention, the pearlescent pigments have at least one further protective layer on the optically active layer, preferably high-index layer.

The at least one further protective layer may [be] at least one metal oxide layer whose metal oxides are selected from the group consisting of $SiO_2$, $Al_2O_3$, cerium oxide, and mixtures thereof, and combinations thereof. As a protective layer it is also possible to apply a plastics coating, such as a polyacrylate layer, for example.

Particularly preferred in this context are protective layers of $SiO_2$ or of cerium oxide in combination with $SiO_2$, as are described in EP 1727864 A1 and EP 1682622 A1, hereby incorporated by reference.

The process of the invention for producing the pearlescent pigments of the invention comprises the following steps:
a) classifying the largely transparent substrate, to give a substrate having an average height $h_S$ of 40 to 110 nm, preferably from 40 to below 100 nm,
b) coating the classified substrate with an optically active, preferably high-index, layer, to give a pearlescent pigment having an average size $d_{50}$ of 3 to 8 µm.

Classifying the largely transparent, preferably transparent, substrate may be done by means of various methods, such as gravity sedimentation, sedimentation in a decanter, sieving, use of a cyclone or hydrocyclone, spiral classifying, or a combination of two or more of these methods. A method such as sieving, for example, may also be used in a plurality of successive steps.

The pearlescent pigments of the invention are used preferably in coating compositions, which are selected preferably from the group consisting of paints, printing inks, cosmetics, plastics, glass, enamel, and ceramic.

The coating composition of the invention is preferably a cosmetic which is selected from the group consisting of concealer sticks, body powder, face powder, compact and loose powder, face makeup, powder cream, cream makeup, emulsion makeup, wax makeup, foundation, mousse makeup, blusher, eye makeup such as eye shadow, mascara, eyeliners, liquid eyeliners, eyebrow pencils, lipcare sticks, lipsticks, lip gloss, lip liners, hair-styling compositions such as hair spray, hair-setting products, hair mousse, hair gel, hair wax, hair mascara, permanent and semipermanent hair colors, temporary hair colors, skincare compositions such as lotions, gels, and emulsions, and nail varnish compositions.

The pearlescent pigments of the invention are used preferably as soft-focus pigment, more particularly in cosmetics.

The coating composition of the invention is preferably a cosmetic product comprising one of the pearlescent pigments of the invention. The cosmetic product of the invention here may be one of the cosmetics specified above.

Determining the average layer thicknesses and their distribution or standard deviation of a substrate may take place—as known in the prior art—by means of SEM measurements. For this purpose, the pearlescent pigments are incorporated into a varnish, applied to a base—of metal or card, for example—by spraying or knife drawdown, for example, and cured. A cross section of the cured varnish is then taken, and this cross section is examined by SEM, and the pigment particles are measured. In order to obtain statistically underpinned values, at least 100 pigment particles ought to be counted. For the purposes of this invention, the determination of the layer thickness of the substrate and of the optically active layer, of a metal oxide coating or of a semitransparent metal layer, for example, can take place by this method.

With this method it is important that the pearlescent pigments are oriented largely plane-parallel. By this is meant that around 90% of the pearlescent pigments deviate by not more than ±15° and preferably not more than ±10° from the average orientation.

If the orientation of the pearlescent pigments in the coating film is poor, a significant measurement error is obtained. One reason for this is that the pearlescent pigments in the cross section are tilted by an azimuthal angle $\alpha$ with respect to the observer. Another reason is that, owing to the surrounding binder medium, the imaging obtained has no depth definition, and so this angle cannot be estimated. Accordingly, an image of the layer thickness is "seen" which is enlarged by a factor of $1/\cos \alpha$. At relatively large angles, this factor causes a significant error. Depending on the size of the angle $\alpha$, therefore, the layer thicknesses determined by this method may be too high.

For the purposes of this invention, preferably the average substrate layer thickness $h_S$ in accordance with the process of the invention is determined in order to arrive at more precise results. In the process of the invention, the average substrate thickness is determined from the relationship between metal oxide content and the layer thickness of the metal oxide. Finer and, as will be shown below, primarily thinner substrates possess higher specific surface areas. When these thinner substrates are coated with a material, it is necessary, in order for coating to achieve a defined layer thickness, for them to be coated with more material than thicker substrates (per unit weight). This translates to a higher specific amount of the coating material in the overall pearlescent pigment, i.e., a higher coating material content, based on the weight of substrate employed.

The process of the invention is based on the following model:

a) the pigments consist of cylinders (platelets) having a uniform radius $r_S$ and a uniform height $h_S$. Calculation consequently takes place from the outset with "average values".

b) The probability of the coating molecules depositing on the substrate is equally high everywhere. Consequently, there is no difference, for example, between margin or surface of the platelet layer thickness. As a result of this assumption, the coating forms a uniform layer thickness $d_M$ everywhere. The index M here stands for optically active coating, preferably metal oxide and/or metal. The uniform coating thickness is actually observed in SEM investigations on a large number of coated, platelet-shaped effect pigments.

c) Secondary precipitation of M is disregarded; in other words, all of the material of M is applied as a coating on the substrate.

The amount of the coating M is defined as follows:

$$c_M = 100 * \frac{m_M}{m_M + m_S} \quad \text{(eq. 1)}$$

Here, $m_M$ is the mass of the coating and $m_S$ the mass of the substrate. These parameters may also be expressed via the densities and volumes:

$$c_M = 100 * \frac{\rho_M \cdot V_M}{\rho_M \cdot V_M + \rho_S \cdot V_S} \quad \text{(eq. 2)}$$

Here, $\rho_S$ and $\rho_M$ are the densities of the substrate and of the coating. For the volume of the substrate, the following simple relationship applies (cylinder volume):

$$V_S = \pi r_S^2 h_S \quad \text{(eq. 3)}$$

The volume of the coating material, $V_M$, is calculated by a model which is outlined in FIG. 1.

The volume of the coating material, $V_M$, is calculated by a model which is outlined in FIG. 1.

The volume of the deposited metal oxide is divided in principle between the end faces and the margin, and is represented in three terms (see FIG. 1)

$$V_M = (V_{M,1} + V_{M,2} + V_{M,3}) \quad \text{(Gl. 4)}$$

$$V_M = \left[2\pi \cdot d_M (r_S)^2 + \left(\frac{4}{3}\pi \cdot d_M^3 + \pi^2 d_M^2 r_S\right) + (\pi \cdot d_M^2 h_S + 2\pi \cdot r_S \cdot d_M \cdot h_S)\right] \quad \text{(eq. 5)}$$

Here, $h_S$ is the average height of the substrate, $r_S$ is the average diameter of the substrate, and $d_M$ is the height of the layer thickness of the metal oxide.

Combining these equations, finally, gives the following expression:

$$c_M = \frac{100}{1 + \frac{\rho_S}{\rho_M} * \frac{h_S \cdot r_S^2}{\left(\frac{4}{3}d_M^3 + (\pi \cdot r_S + h_S) \cdot d_M^2 + (2r_S^2 + 2r_S h_S) \cdot d_M\right)}} \quad \text{(eq. 6)}$$

If this equation is resolved, in turn, for the average substrate thickness $h_S$, then the following expression is obtained:

$$h_S = \frac{\frac{4d_M^3}{3r_S^2} + \frac{\pi d_M^2}{r_S} + 2 \cdot d_M}{\frac{\rho_S}{\rho_M \cdot \left(\frac{100}{c_M} - 1\right)} - \left(\frac{d_M}{r_S}\right)^2 - 2 \cdot \frac{d_M}{r_S}} \quad \text{(eq. 7)}$$

In the context of this invention, the average substrate thickness $h_S$ is defined preferably via this equation when the layer thickness $d_M$ is 40 to 180 nm.

At higher layer thicknesses, the formula is imprecise, since the high level of the optically active coating material causes the amount $c_M$ to run to a limiting value. At low layer thicknesses, likewise, effective differentiation is impossible.

The average radius of the substrate is determined preferably via laser diffraction measurements on the pearlescent pigments, preferably by means of laser granulometry using the Cilas 1064 from Cilas. In that case the $d_{50}$ value of the cumulative size distribution curve is employed; the relationship which applies is then as follows:

$$d_{50}/2 = r_S \quad \text{(eq. 8)}$$

The parameter $c_M$ is determined via analytical measurements. In this case it is preferable to carry out an XFA analysis (X-Ray Fluorescence Analysis) on finely divided pigment material. If necessary, the pigment powder is comminuted beforehand in a mill or in a mortar in order to provide a uniform sample material. Alternatively, the pearlescent pigment may also be dissolved, for example, using hydrofluoric acid, and the SFA analysis then performed from the solution.

Moreover, the analytical amounts of substrate and optically active material may also be determined via ICP (Inductively Coupled Plasma).

For densities it is preferred to use literature values (Handbook Chemistry and Physics). Examples of typical values are as follows:

TABLE 1

Densities of common materials of pearlescent pigments

| Material | Density | Function |
|---|---|---|
| Mica | 2.7 | Substrate |
| $Al_2O_3$ | 4.0 | Substrate (predominantly) |
| $SiO_2$ | 2.2-2.7 | Substrate (predominantly) |
| $TiO_2$ (rutile) | 4.3 | Coating |
| $TiO_2$ (anatase) | 3.9 | Coating |
| $Fe_2O_3$ (hematite) | 5.2 | Coating |
| $Fe_3O_4$ (magnetite) | 5.2 | Coating |

Where hybrid layers of two or more high-index layers are used, the density of the coating can be calculated from the literature values weighted with the analytically obtainable weight ratios between the individual materials.

The layer thickness of the metal oxide, finally, can be determined for example, and preferably, via the color of the pearlescent pigment. The underlying physical formulae of the optical qualities of pearlescent pigments have been set out in C. Schmidt, M. Fritz "Optical Physics of Synthetic Interference Pigments" Kontacte (Darmstadt) 1992 (2) pp. 15-24.

The color in this case may also be determined by means of a suitable arithmetic program such as the "Filmstar" software from FTG Software Associates, USA. In this case it is necessary to use the optical constants (refractive index n and optionally absorption constant k) of the optically active layer in the range of the optical wavelengths (400 to 800 nm). Values of this kind are well known for the usual materials.

The layer thickness may additionally be determined on the basis of the color from the publicly available information. For example, for $TiO_2$-coated pearlescent pigments based on mica, the following known relationship applies:

TABLE 2

Typical colors and layer thicknesses of pearlescent pigments

| | Coverage/layer thickness | Color |
|---|---|---|
| Silver-white pearlescent pigments | $TiO_2$: 40-60 nm | silver |
| Interference pigments | $TiO_2$: 60-80 nm | yellow |
| | $TiO_2$ 80-100 nm | red |
| | $TiO_2$: 100-140 nm | blue |
| | $TiO_2$: 120-160 nm | green |
| | $TiO_2$: 280-320 nm | green (IIIrd order) |
| Color luster pigments | $Fe_2O_3$: 35-45 nm | bronze |
| | $Fe_2O_3$: 45-55 nm | copper |
| | $Fe_2O_3$: 55-65 nm | red |
| | $Fe_2O_3$: 65-75 nm | red-violet |
| | $Fe_2O_3$: 75-85 nm | red-green |

In the majority of cases the color is determined almost exclusively by the layer thickness of the high-index coating (F. Hofineister, Farbe+Lack 95, 557 (1989)).

Particularly in the case of pearlescent pigments with a large standard deviation in the substrate thickness distribution, the coloration is largely dependent not on the average thickness of the substrate, but is instead determined largely by the layer thickness of the high-index layer.

In one preferred embodiment the pearlescent pigment of the invention has a standard deviation of the substrate height $h_S$ of 25% to 80%, preferably of 30-60%, and more preferably of 28% to 50%.

If the substrate with its layer thickness is likewise, in a non-negligible way, to determine the interference color, then a more precise optical calculation must be employed. In this case, the layer thickness of the substrate and of the optically active layer, preferably of the high-index metal oxide layer, may be determined, for example, from the positions of the maxima and/or minima of the remission spectrum of the pearlescent pigments.

Should the pearlescent pigment have a hybrid coating of two or more high-index oxides, then the optical constants are to be calculated, in analogy to the density calculation, from a weighting from the analytically available weight ratios of the individual high-index oxides.

Where, in contrast, the pearlescent pigment has a combination of two high-index oxides, the model can be used nevertheless. In the case of the first coating with high-index metal oxide, eq. 7 can be used directly. In the case of the calculation of the second high-index oxide, however, the layer thickness of the first oxide must be taken into account.

The layer thickness of the optically active layer, preferably of the high-index metal oxide layer, may also be determined, moreover, by SEM counting on well-oriented cross sections of the pearlescent pigments.

Another method for determining the average substrate layer thickness involves preparing the thicknesses of the (coated) pearlescent pigments in accordance with the method described in WO 2004/07816 A2 and likewise subjecting them to SEM measurement. In this case, at least 100 pigment particles ought to be measured, in order to give meaningful statistics. Subsequently, the arithmetic average value is determined. This represents the average thickness of the pearlescent pigment, $d_{tot}$, and, of course:

$$d_{tot} = 2d_M + h_S \qquad \text{(eq. 9)}$$

Starting from equation (7) it is possible, by means of equation 9, to eliminate $d_M$ and then resolve it for $h_S$. In this case it is possible, in good approximation, to disregard the higher terms of $h_S$ and hence to determine $h_S$ from the relationship between the amount of the optically active layer $c_M$ and the average total pigment layer thickness $d_{tot}$.

The methods based on eq. 7 for determining the average substrate layer thickness may also be used generally for platelet-shaped effect pigments. These pigments possess a platelet-shaped substrate and also a coating. This platelet-shaped substrate also encompasses metal pigments.

The transparent, platelet-shaped substrate of the pearlescent pigments of the invention is taken from the group consisting of mica, synthetic mica, glass flakes, $SiO_2$ platelets, $Al_2O_3$ platelets or mixtures thereof. This substrate is preferably glass flakes or mica, and very preferably mica.

Naturally occurring mica, as is known, has a partially stepped surface. The nonuniformities of color that occur as a result in corresponding pearlescent pigments are entirely desired for the purposes of this invention, since they intensify the scattering effects.

In further embodiments according to the invention, the pearlescent pigments have at least one further low-index layer. This layer may be applied between substrate and high-index layer, or on the high-index layer. In the case of mica or synthetic mica, a layer of this kind can be readily distinguished by analysis. Mica, as a natural mineral, has characteristic impurities, although its principal constituent is silicate. On the basis of these impurities, an $SiO_2$ coating, for example, can be distinguished from mica, and eq. 7 can be applied accordingly. The layer structure can also be analyzed, for example, from cross sections and/or by ESCA (Electron Spectroscopy for Chemical Analysis) in conjunction with sputter profiles.

EXAMPLES

The examples which follow illustrate the invention, but without restricting it.

Examples 1 a-d $TiO_2$-Coated Mica

Example 1α

1 kg of muscovite mica MD 2800 from Minelco Specialities Ltd., England, was calcined at 700° C. for 1 hour, thereafter admixed with 1000 mL of DI water, and then delaminated in a laboratory edge-runner mill from American Cyanamid Company for approximately 1 hour.

The cake was subsequently brought with DI water to a 35% solids content, and was sieved to <25 µm through a Separator laboratory sieve from Sweco.

The fine mica fraction thus obtained was then treated in a TD 200 laboratory dissolver from Pendraulik for 5 hours. During this treatment it is necessary to ensure that, by cooling, the temperature of the suspension does not exceed 80° C.

The mica suspension was then diluted with DI water to 3% solids content and settled using a sedimentation vessel for 5 hours. The supernatant was drawn off by suction, and the sediment was again taken up with water, stirred up vigorously, and again settled for 5 hours. This operation was repeated a total of 4 times, until there was virtually no longer any supernatant apparent.

The sedimentation vessel possessed a cylindrical shape with the following dimensions: d=50 cm; h=50 cm.

The mica originating from the supernatants was collected in a large container and induced to settle by addition of NaCl. After approximately 48 hours, the clear supernatant salt solution was drawn off by suction and the filter cake obtained was used as SM for further coatings.

In this way, an extremely fine mica is obtained with a $d_{50}$=3.8 µm (Cilas 1064) of the volume-averaged particle size distribution and also with an average thickness $h_S$ (from SEM)=82 nm (see tab. 3).

1a

Interference, Blue, 1st Order 100 g of platelet-shaped muscovite mica from example 1α were suspended in DI water. A pH of 2.2 was set by metered addition of dilute hydrochloric acid, and the suspension was heated to 80° C. Then 50 ml of an Sn chloride solution with c(Sn)=24 g/L were metered in over 90 minutes. The pH was held constant at 2.2 by simultaneous introduction of a 15% strength aqueous alkaline earth metal hydroxide solution. After an interruption of about ¼ h, during which the solution was stirred further, its pH was adjusted to 1.8 by metered addition of dilute hydrochloric acid. Subsequently, the addition was commenced of 1.85 L of a solution of 150 g of $TiCl_4$ and 50 g of HCl per liter. The pH was kept constant by simultaneous introduction of a 15% strength aqueous alkaline earth metal hydroxide solution.

At the end of the addition, a very powerful, hitherto unknown light blue pearl luster was obtained. The suspension was stirred for a further hour, cooled, filtered with suction through a Büchner funnel, and washed with DI water until virtually ion-free.

Finally, the pigment was calcined at 750° C. for 20 minutes.

Example 1b

Interference, Silver 100 g of platelet-shaped muscovite mica from example 1α were suspended in DI water. A pH of 2.2 was set by metered addition of dilute hydrochloric acid, and the suspension was heated to 80° C. Then 50 ml of an Sn chloride solution with c(Sn)=24 g/L were metered in over 90 minutes. The pH was held constant at 2.2 by simultaneous introduction of a 15% strength aqueous alkaline earth metal hydroxide solution. After an interruption of about ¼ h, during which the solution was stirred further, its pH was adjusted to 1.8 by metered addition of dilute hydrochloric acid. Subsequently, the addition was commenced of 2.4 L of a solution of 150 g of $TiCl_4$ and 50 g of HCl per liter. The pH was kept constant by simultaneous introduction of a 15% strength aqueous alkaline earth metal hydroxide solution.

At the end of the addition, a powerful silvery pearl luster was obtained. The suspension was stirred for a further hour, cooled, filtered with suction through a Büchner funnel, and washed with DI water until virtually ion-free.

Finally, the pigment was calcined at 800° C. for 20 minutes.

Example 1c

Interference, Gold 100 g of platelet-shaped muscovite mica from example 1α were suspended in DI water. A pH of 2.2 was set by metered addition of dilute hydrochloric acid, and the suspension was heated to 80° C. Then 50 ml of an Sn chloride solution with c(Sn)=24 g/L were metered in over 90 minutes. The pH was held constant at 2.2 by simultaneous introduction of a 15% strength aqueous alkaline earth metal hydroxide solution. After an interruption of about ¼ h, during which the solution was stirred further, its pH was adjusted to 1.8 by metered addition of dilute hydrochloric acid. Subsequently, the addition was commenced of 3.2 L of a solution of 150 g of $TiCl_4$ and 50 g of HCl per liter. The pH was kept constant by simultaneous introduction of a 15% strength aqueous alkaline earth metal hydroxide solution.

At the end of the addition, a very powerful golden pearl luster was obtained. The suspension was stirred for a further hour, cooled, filtered with suction through a Büchner funnel, and washed with DI water until virtually ion-free.

Finally, the pigment was calcined at 750° C. for 20 minutes.

Example 1d

Interference, Red 100 g of platelet-shaped muscovite mica from example 1α were suspended in DI water. A pH of 2.2 was set by metered addition of dilute hydrochloric acid, and the suspension was heated to 80° C. Then 50 ml of an Sn chloride solution with c(Sn)=24 g/L were metered in over 90 minutes. The pH was held constant at 2.2 by simultaneous introduction of a 15% strength aqueous alkaline earth metal hydroxide solution. After an interruption of about ¼ h, during which the solution was stirred further, its pH was adjusted to 1.8 by metered addition of dilute hydrochloric acid. Subsequently, the addition was commenced of 5.6 L of a solution of 150 g of $TiCl_4$ and 50 g of HCl per liter. The pH was kept constant by simultaneous introduction of a 15% strength aqueous alkaline earth metal hydroxide solution.

At the end of the addition, a powerful red pearl luster was obtained. The suspension was stirred for a further hour, cooled, filtered with suction through a Büchner funnel, and washed with DI water until virtually ion-free.

Finally, the pigment was calcined at 800° C. for 20 minutes.

Example 1e

Interference, Blue, 2nd Order 100 g of platelet-shaped muscovite mica from example 1α were suspended in DI water. A pH of 2.2 was set by metered addition of dilute hydrochloric acid, and the suspension was heated to 80° C. Then 50 ml of an Sn chloride solution with c(Sn)=24 g/L were metered in over 90 minutes. The pH was held constant at 2.2 by simultaneous introduction of a 15% strength aqueous alkaline earth metal hydroxide solution. After an interruption of about ¼ h, during which the solution was stirred further, its pH was adjusted to 1.8 by metered addition of dilute hydrochloric acid. Subsequently, the addition was commenced of 7.2 L of a solution of 150 g of $TiCl_4$ and 50 g of HCl per liter. The pH was kept constant by simultaneous introduction of a 15% strength aqueous alkaline earth metal hydroxide solution.

At the end of the addition, a powerful, blue pearl luster was obtained. The suspension was stirred for a further hour, cooled, filtered with suction through a Büchner funnel, and washed with DI water until virtually ion-free.

Finally, the pigment was calcined at 800° C. for 20 minutes.

Comparative Example 1a-e

Commercially available $TiO_2$-coated pearlescent pigments of the Prestige Soft series (from Eckart GmbH).

These pigments were based on a muscovite mica, referred to below as muscovite mica 1β, having a $d_{50}$ value of 6.5 μm and an average thickness of 119 nm (see tab. 3).

Comparative Example 1a

Interference, Silver

Commercially available $TiO_2$-coated silver pearlescent pigment: Prestige Soft Silber (from Eckart GmbH).

Comparative Example 1b

Interference, Gold

Commercially available $TiO_2$-coated silver pearlescent pigment: Prestige Soft Gold (from Eckart GmbH).

Comparative Example 1c

Interference, Orange

Commercially available $TiO_2$-coated silver pearlescent pigment: Prestige Soft Orange (from Eckart GmbH).

Comparative Example 1d

Interference, Red

Commercially available $TiO_2$-coated silver pearlescent pigment: Prestige Soft Red (from Eckart GmbH).

Comparative Example 1e

Interference, Green 100 g of platelet-shaped muscovite mica 1β ($d_{50}$: 6.5 μm; particle thickness see tab. 3) were suspended in DI water. A pH of 2.2 was set by metered addition of dilute hydrochloric acid, and the suspension was heated to 80° C. Then 50 ml of an Sn chloride solution with c(Sn)=24 g/L were metered in over 90 minutes. The pH was held constant at 2.2 by simultaneous introduction of a 15% strength aqueous alkaline earth metal hydroxide solution. After an interruption of about ¼ h, during which the solution was stirred further, its pH was adjusted to 1.8 by metered addition of dilute hydrochloric acid. Subsequently, the addition was commenced of 4.5 L of a solution of 150 g of $TiCl_4$ and 50 g of HCl per liter. The pH was kept constant by simultaneous introduction of a 15% strength aqueous alkaline earth metal hydroxide solution.

At the end of the addition, a very strong, green pearl luster was obtained. The suspension was stirred for a further hour, cooled, filtered with suction through a Büchner funnel, and washed with DI water until virtually ion-free.

Finally, the pigment was calcined at 800° C. for 20 minutes.

Comparative Example 2a-f

Commercially available $TiO_2$-coated pearlescent pigments of the Mearlin Micro series (from BASF Catalysts).

Comparative Example 3

Commercially available $TiO_2$-coated silver pearlescent pigment Magna Pearl Silver (from BASF Catalysts).

Example 2a-d $Fe_2O_3$-coated mica produced as per example 1α.

Example 2a

Bronze 100 g of platelet-shaped muscovite mica from example 1α were suspended in DI water. A pH of 2.9 was set by metered addition of dilute hydrochloric acid, and the suspension was heated to 75° C. Then, with a metering rate of 150 mL/h, an iron sulfate solution was added which contained 65 g of $Fe_2(SO_4)_2 \times 9H_2O$ and 1 mL of concentrated sulfuric acid per 100 mL of solution. The pH was held at 3.8 by simultaneous metered addition of a 15% strength aqueous alkaline earth metal hydroxide solution. The iron hydroxide was obtained as a brownish precipitate, and is deposited on the pigment particles.

Following addition of 1500 mL of $Fe_2(SO_4)_2$ solution, the covering was broken off, followed by stirring at temperature for 1 hour, cooling, suction using a Büchner funnel, and washing with DI water to a virtually ion-free state.

The pigment was calcined at 780° C. for 20 minutes.

The pigment thus obtained possessed bronze color characteristics with a good luster and with a high scattering density at the same time.

Example 2b

Fire Red 100 g of platelet-shaped muscovite mica from example 1α were suspended in DI water. A pH of 2.9 was set by metered addition of dilute hydrochloric acid, and the suspension was heated to 75° C. Then, with a metering rate of 150 mL/h, an iron sulfate solution was added which contained 65 g of $Fe_2(SO_4)_3 \times 9H_2O$ and 1 mL of concentrated sulfuric acid per 100 mL of solution. The pH was held at 3.8 by simultaneous metered addition of a 15% strength aqueous alkaline earth metal hydroxide solution. The iron hydroxide was obtained as a brownish precipitate, and is deposited on the pigment particles.

Following addition of 2300 mL of $Fe_2(SO_4)_3$ solution, the covering was broken off, followed by stirring at temperature for 1 hour, cooling, suction using a Büchner funnel, and washing with DI water to a virtually ion-free state.

The pigment was calcined at 780° C. for 20 minutes.

The pigment thus obtained possessed fire-red color characteristics with a good luster and with high light scattering at the same time.

Example 2c

Red-Green 100 g of platelet-shaped muscovite mica from example 1α were suspended in DI water. A pH of 2.9 was set by metered addition of dilute hydrochloric acid, and the suspension was heated to 75° C. Then, with a metering rate of 150 mL/h, an iron sulfate solution was added which contained 65 g of $Fe_2(SO_4)_3 \times 9H_2O$ and 1 mL of concentrated sulfuric acid per 100 mL of solution. The pH was held at 3.8 by simultaneous metered addition of a 15% strength aqueous alkaline earth metal hydroxide solution. The iron hydroxide was obtained as a brownish precipitate, and is deposited on the pigment particles.

Following addition of 2900 mL of $Fe_2(SO_4)_3$ solution, the covering was broken off, followed by stirring at temperature for 1 hour, cooling, suction using a Büchner funnel, and washing with DI water to a virtually ion-free state.

The pigment was calcined at 780° C. for 20 minutes.

The pigment thus obtained possessed red-green color characteristics (depending on viewing angle) with a good luster and with high light scattering at the same time.

Comparative Example 4a-c

Commercially available $Fe_2O_3$-coated pearlescent pigments of the Prestige Soft series (from Eckart GmbH).

These pigments were based on a muscovite mica 1β having a $d_{50}$ value of 6.5 μm and an average thickness of 119 nm (see tab. 3).

Comparative Example 4a

Bronze

Commercially available $Fe_2O_3$-coated bronze pearlescent pigment Prestige Soft Bronze (from Eckart GmbH).

Comparative Example 4b

Copper

Commercially available $Fe_2O_3$-coated copper pearlescent pigment Prestige Soft Copper (from Eckart GmbH).

Comparative Example 4c

Fire-Red

Commercially available $Fe_2O_3$-coated fire-red pearlescent pigment Prestige Soft Fire Red (from Eckart GmbH).

Example 3

Interference, Red, on Glass 100 g of commercially available ECR glass from Glassflake Ltd. (GF 100 NM) with an average thickness of approximately 95 nm and a size $d_{50}$=7 μm were suspended in DI water. A pH of 2.2 was set by metered addition of dilute hydrochloric acid, and the suspension was heated to 80° C. Then 50 mL of an Sn chloride solution with c(Sn)=24 g/L were metered in over 90 minutes. The pH was held constant at 2.2 by simultaneous introduction of a 15% strength aqueous alkaline earth metal hydroxide solution. After an interruption of about ¼ h, during which stirring of the solution was continued, its pH was adjusted to 1.8 by metered addition of dilute hydrochloric acid. Subsequently, the addition was commenced of 5.6 L of a solution of 150 g of $TiCl_4$ and 50 g of HCl per liter. The pH was held constant by simultaneous introduction of a 15% strength aqueous alkaline earth metal hydroxide solution.

At the end of the addition, a powerful, red pearl luster was obtained. The suspension was stirred for a further 1 hour, cooled, filtered with suction through a Büchner funnel, and washed with DI water until virtually ion-free.

Lastly, the pigment was calcined at 550° C. for 40 minutes.

Comparative Example 5e-f

Commercially available $TiO_2$-coated pearlescent pigments of the Prestige Silk series (from Eckart GmbH).

These pigments are based on a muscovite mica having a $d_{50}$ value of 10.5 μm and an average thickness of approximately 200 nm.

Comparative Example 5e

Interference, Blue

Commercially available $TiO_2$-coated blue pearlescent pigment Prestige Silk Blue (from Eckart GmbH).

Comparative Example 5f

Interference, Green

Commercially available $TiO_2$-coated green pearlescent pigment Prestige Silk Green (from Eckart GmbH).

Comparative Example 6a

Commercially available $TiO_2$-coated pearlescent pigments Spectraflex® Focus White from SunChemical with a silver interference color.

Comparative Example 6d

Commercially available $TiO_2$-coated pearlescent pigments Spectraflex® Focus Red from SunChemical with a red interference color.

Example 4

Body Lotion

| INCI name | Product name | % W/W 100.00 | Supplier |
|---|---|---|---|
| Phase A | | | |
| Water | | 81.20 | |
| Carbomer | Acritamer 934 | 0.50 | www.ritacorp.com |
| Phase B | | | |
| Propylene Glycol | 1,2-Propanediol | 2.75 | www.vwr.com |
| Glycerin | Pricerine 9090 | 0.50 | www.uniqema.com |
| Phase C | | | |
| Mica (and) Titanium Dioxide | as per Ex. 1b (silver) | 2.00 | www.eckart.net |
| Isopropyl Palmitate | Rita IPP NF | 2.00 | www.ritacorp.com |
| Glyceryl Stearate | Imwitor 960 K | 2.00 | www.sasolwax.com |
| Stearic Acid | Kortacid 1895 | 2.00 | www.akzonobel.com |
| *Butryospermum Parkii* Butter (Shea Butter) | Shea Butter | 2.00 | www.jandekker.com |
| Cetyl Alcohol | Cetyl Alcohol | 1.00 | www.vwr.com |
| Cyclomethicone | Dow Corning 345 Fluid | 0.20 | www.dowcorning.com |
| Dimethicone | Dow Corning 200 Fluid/ 350 cst | 0.20 | www.dowcorning.com |
| Isostearyl Lactate | Patlac IL | 2.00 | www.ritacorp.com |
| Methylparaben, Propylparaben | Rokonsal SSH-1 | 0.30 | www.biochema.com |
| Tocopheryl Acetate | DL-Alpha-Tocopherol acetate | 0.10 | www.roche.com |
| Phase D | | | |
| Triethanolamine | Triethanolamine | 0.75 | www.vwr.com |
| Panthenol | D-Panthenol 75 L | 0.50 | www.basf.com |
| Fragrance | Palma Energy DF05 | q.s. | www.bell-europe.com |

The amount of pearlescent pigment (INCI: mica and titanium dioxide) used can be varied in a range from 0.1% to 5.0% by weight. This variation can be compensated by a corresponding increase or reduction in the amount of water added.

Procedure:

1. Combine phase A, add phase B with stirring
2. Heat phase AB with stirring to 80° C.
3. Heat phase C to 80° C.
4. Add oil phase to water phase with agitation
5. Cool to 50° C. and add phase D
6. Continue stirring until 40-45° C. are reached
7. Cool to room temperature

Example 5

Hair Mascara

| INCI name | Product name | % W/W 100.00 | Supplier |
|---|---|---|---|
| Phase A | | | |
| Polyquaternium-16 | Luviquat FC 905 (Luviquat Exellence) | 2.70 | www.basf.com |
| Propylene Glycol | 1,2-Propanediol | 1.80 | www.vwr.com |
| Methylparaben | Methyl 4-hydroxybenzoate | 0.20 | www.sigmaaldrich.com |
| Water | | 64.45 | |
| Phase B | | | |
| Cetearyl Alcohol | Lanette O | 5.00 | www.cognis.com |
| Dimethicone | Dow Corning 200 Fluid/350 cst | 1.00 | www.dowcorning.com |
| Ceteareth-25 | Cremophor A 25 | 2.00 | www.basf.com |
| Propylparaben | Propyl 4-hydroxy-benzoate | 0.10 | www.sigmaaldrich.com |
| Phase C | | | |
| Hydroxypropyl-cellulose | Klucel G | 0.50 | www.herc.com |
| Magnesium Aluminium Silicate | Veegum HV | 0.50 | www.rtvanderbilt.com |
| | Water | 19.00 | |
| Phase D | | | |
| MICA (AND) IRON OXIDES | as per Ex. 2a (bronze) | 2.50 | www.eckart.net |
| Phenoxyethanol (and) Methylparaben (and) Butylparaben (and) Ethylparaben (and) Propylparaben (and) Isobutylparaben | Phenonip | 0.20 | www.clariant.com |
| Fragrance | Blue Shadow ÖKO | 0.05 | www.bell-europe.com |

The amount of pearlescent pigment used (INCI: mica and titanium dioxide) can be varied in a range from 0.5% to 10.0% by weight. This variation can be compensated by a corresponding increase or reduction in the amount of water added.

Procedure:
1. Heat phases A and B separately to 80° C.
2. Add phase B slowly to phase A.
3. Stir Klucel and Veegum in a separate container into the water of phase C.
4. Cool phase AB to 40° C.
5. Add phases C and D.

Example 6

Lip Gloss

| INCI name | Product name | % W/W 100.00 | Supplier |
|---|---|---|---|
| Phase A | | | |
| Hydrogenated Polyisobutene (and) Ethylene/Propylene/Styrene Copolymer (and) Butylene/Ethylene/Styrene Copolymer | Versagel ME 750 | ad 100 | www.penreco.com |
| Simmondsia Chinensis (Jojaba) Seed Oil | Jojoba Oil-Natural/Golden | 2.00 | www.biochemica.com |
| Caprylyl Trimethicone | Silcare Silicone 31M50 | 7.00 | www.clariant.com |
| Stearyl Dimethicone | Silcare Silicone 41M65 | 3.20 | www.clariant.com |
| Hydrogenated Polydecene | Nexbase 2002 | 4.00 | www.jandekker.com |
| Isopropyl Myristate | Isopropyl Myristate | 4.50 | www.vwr.com |

-continued

| INCI name | Product name | % W/W 100.00 | Supplier |
|---|---|---|---|
| Phase B | | | |
| Mica (and) Titanium Dioxide | as per Ex. 1b (silver) | 5.00 | www.eckart.net |
| Propylparaben | Propyl 4-hydroxybenzoate | 0.20 | www.sigmaaldrich.com |

The amount of pearlescent pigment used (INCI: mica and titanium dioxide) can be varied in a range from 0.1 to 8.0% by weight. This variation can be compensated by a corresponding increase or reduction in the amount of Versagel ME 750 added.

Procedure:
1. Heat phase A to 85° C.
2. Add phase B to phase A, and mix until consistency is uniform.
3. Fill into a lip gloss container.

Example 7

Lip Gloss

| INCI name | Product name | % W/W 100.00 | Supplier |
|---|---|---|---|
| Phase A | | | |
| Hydrogenated Polyisobutene (and) Ethylene/Propylene/Styrene Copolymer (and) Butylene/Ethylene/Styrene Copolymer | Versagel ME 750 | ad 100 | www.penreco.com |
| Simmondsia Chinensis (Jojaba) Seed Oil | Jojoba Oil-Natural/Golden | 2.00 | www.biochemica.com |
| Caprylyl Trimethicone | Silcare Silicone 31M50 | 7.00 | www.clariant.com |
| Stearyl Dimethicone | Silcare Silicone 41M65 | 3.20 | www.clariant.com |
| Hydrogenated Polydecene | Nexbase 2002 | 4.00 | www.jandekker.com |
| Isopropyl Myristate | Isopropyl Myristate | 4.50 | www.vwr.com |
| Phase B | | | |
| Mica (and) Iron Oxides | as per Ex. 2b (fire-red) | 5.00 | www.eckart.net |
| Propylparaben | Propyl 4-hydroxybenzoate | 0.20 | www.sigmaaldrich.com |

The amount of pearlescent pigment used (INCI: mica and titanium dioxide) can be varied in a range from 0.1 to 8.0% by weight. This variation can be compensated by a corresponding increase or reduction in the amount of Versagel ME 750 added.

Procedure:
1. Heat phase A to 85° C.
2. Add phase B to phase A, and mix until consistency is uniform.
3. Fill into a lip gloss container.

Example 8

Pressed Eye Shadow

| INCI name | Product name | % W/W 100.00 | Supplier |
|---|---|---|---|
| Phase A | | | |
| Mica | Silk Mica | 17.00 | www.vwr.com |
| Boron Nitride | Softouch CCS 102 | 2.50 | www.advceramicscos.com |
| Zinc Stearate | Kemilub EZ-V | 7.00 | www.undesa.com |
| Talc | Talc Powder | 38.50 | www.riedeldehaen.com |
| Mica (and) Titanium Dioxide | as per Ex. 1b (silver) | 25.00 | www.eckart.net |
| Phase B | | | |
| Dimethicone | Dow Corning® 200 Fluid 5 cst | 5.00 | www.dowcorning.com |
| Cyclomethicone (and) Dimethicone Crosspolymer | Dow Corning® 9040 Elastomer | 5.00 | www.dowcorning.com |

The amount of pearlescent pigment used (INCI: mica and titanium dioxide) can be varied in a range from 5.0% to 40.0% by weight. This variation can be compensated by a corresponding increase or reduction in the amount of mica added.

Procedure:
1. Combine ingredients of phase A
2. Mix for 30 seconds at 2500 rpm in a Speedmixer
3. Add phase B and mix for 60 seconds at 3000 rpm in a Speedmixer
4. Press at 150 bar for 30 seconds

Example 9

Whitening Cream

| INCI name | Product name | % W/W 100.00 | Supplier |
|---|---|---|---|
| Phase A | | | |
| Candelilla/Jojoba/Rice Bran Polyglyceryl-3 Esters (and) Glyceryl Stearate (and) Cetearyl Alcohol (and) Sodium Stearoyl Lactylate | Emulium Kappa | 6.50 | www.gattefosse.com |
| Dicaprylyl Ether | Cetiol OE | 2.00 | www.cognis.com |
| Octyldodecanol | Eutanol G | 2.00 | www.cognis.com |
| Caprylic/Capric Triglyceride | Myritol 318 | 3.50 | www.cognis.com |
| *Oenothera Biennis* (Evening Primrose) Oil and Hydrogenated Vegetable Oil | Evening Prime Rose Butter | 0.50 | www.impag.de |
| *Prunus Amygdalus Dulcis* (Sweet Almond) Oil | Sweet Almond Oil | 0.50 | www.aak.com |
| *Butyrospermum Parkii* Butter | Shea Butter | 1.00 | www.jandekker.com |
| Tocopheryl Acetate | D,L-Alpha-Tocopherol acetate | 0.50 | www.jandekker.com |
| Phase B | | | |
| Water | Aqua | 71.70 | |
| Glycerin | Pricerine 9090 | 5.00 | www.uniqema.com |

-continued

| INCI name | Product name | % W/W 100.00 | Supplier |
|---|---|---|---|
| *Chondrus crispus* (carrageenan) (and) Glucose | Viscarin PC 389 | 0.25 | www.fmcbiopolymer.com |
| Xanthan Gum | Keltrol T | 0.15 | www.cpkelco.com |
| Phase C | | | |
| Mica (and) Titanium Dioxide | as per Ex. 1b (silver) | 5.00 | www.eckart.net |
| Kaolin | Kaolin Pharma | 1.00 | www.avokal-heller.de |
| Fragrance | Nacticide | 0.20 | www.sinerga.it |
| Preservative | Preservative | q.s. | |

The amount of pearlescent pigment used (INCI: mica and titanium dioxide) can be varied in a range from 4.0% to 8.0% by weight. This variation can be compensated by a corresponding increase or reduction in the amount of water added.

Procedure:
1. Mix phase B and heat to 75° C.
2. Mix phase A and heat to 75° C.
3. Add phase A slowly with stirring to phase B.
4. Leave to cool with stirring.
5. Add phase C with stirring.
6. Dispense into an appropriate container.

I Physical Characterization

Ia Particle Size Measurement

The pigments of the inventive examples and comparative examples, and also the muscovite mica 1α and muscovite mica 1β, were characterized by means of laser diffraction methods (instrument: Cilas 1064).

For this purpose, approximately 50 mL of the mica suspension (NVC approximately 35%) were mixed with 50 mL of isopropanol, using a magnetic stirrer, and then treated for 300 seconds in a Sonorex IK 52 ultrasound bath from Bandelin. 2-3 mL of sample were then pippetted into the instrument for measurement.

In the case of $TiO_2$-coated pigments, the golden pigments were always used. These pigments contained a relatively small amount of $TiO_2$. A certain level of $TiO_2$ increases the measurement accuracy in comparison to measurement on pure mica, since the higher refractive index of $TiO_2$ means that a stronger measurement signal is obtained.

The $d_{50}$ values of the volume-averaged cumulative undersize distribution are shown in table 3 (column 7).

Ib Determination of the Average Thickness of the Substrate

The average substrate thickness was determined by various methods. The results are set out in tab. 3.

In one case, the pearlescent pigments were incorporated at 10% into an Autoclear Plus HS 2-component clearcoat from Sikkens GmbH, using a sleeve brush, then applied to a film, using a wire-wound coating bar (26 μm wet film thickness) and dried. After a drying time of 24 hours, cross sections were prepared of these knife drawdowns.

The cross sections were measured by SEM. For each sample, at least 100 pigment particles were measured, in order to obtain meaningful statistics. Not only the substrate layer thickness but also the layer thickness of the metal oxide layer was determined.

These determinations were carried out only with selected samples, owing to the large amount of time involved. The results are set out in the outermost column of tab. 3.

For comparison purposes, the muscovite mica 1α, used in examples 1 and 2, and the muscovite mica 1β, used in comparative examples 1 and 4, were investigated. This was done using two methods:

a) In the same way as for the pearlescent pigments, the micas were applied in knife drawdowns, and cross sections were prepared of the cured coatings. By means of SEM, the thicknesses of different mica particles in the cross sections were counted (at least 100 particles).

The arithmetic averages and standard deviations are shown in tab. 3 in column 12.

b) The micas were prepared by the method described in WO 2004/07816 A2 and likewise measured by SEM. The results are shown in tab. 3 in column 11.

Finally, the average substrate height was calculated by eq. 7. In this case, for the substrate radius, half of the $d_{50}$ values of the volume-averaged size distribution was used.

The amounts of $TiO_2$ and of $Fe_2O_3$ and also of substrate material were determined by means of XFA.

For this purpose, the pearlescent pigment powder was introduced directly from the bed into a sample container covered with a 6 μm Spectrolen film, and was measured from this container. The measuring instrument used was the Advant-X instrument from Thermo ARL.

The metal oxide contents according to eq. 1 are set out in tab. 3 in column 4 in % by weight based on metal oxide and substrate.

Finally, it was necessary also to determine the layer thickness of $TiO_2$ and $Fe_2O_3$. Here, the bases used for the work were the colors of the pigments and the usual layer thicknesses published in the literature for them. These oxide layer thicknesses are listed in tab. 3 in column 6, in nm.

The values calculated according to eq. 7 are listed in tab. 3 in column 9, in nm. Moreover, column 10 of tab. 3 shows the average of the calculated average height for all samples of an inventive example or comparative example. Furthermore, for the calculated values, the standard deviation is shown, as an absolute figure and in % based on the average. (This is not the standard deviation of the thicknesses within a sample. That cannot be calculated by eq. 7, since the model is based on averages from the outset.)

In FIG. 2, moreover, there is a graphic representation of the metal oxide content against the layer thickness, which again comes from the color assumptions.

Moreover, calculated curves according to eq. 6 are found, incorporating the average substrate thickness $h_S$ calculated according to equation 7.

TABLE 3

Physical characterization of inventive and comparative examples

| Sample | Substrate | Metal oxide | Amount of metal oxide (eq. 1) in % | Color | Layer thickness metal oxide/nm from color* | from SEM | $d_{50}$** [μm] (instrument: Cilas 1064) | $h_s$ [nm] as per eq. 7 | Average $h_s$/ standard deviation absolute (%) within one example | $h_s$ from SEM on mica [nm] Powder | $h_s$ from SEM on mica [nm] Section | $h_s$ from SEM on pearl luster in section [nm] |
|---|---|---|---|---|---|---|---|---|---|---|---|---|
| Example 1a | Mica as per Ex. 1α | TiO$_2$ | | Blue | | | 4.5 | | | | | |
| Example 1b | Mica as per Ex. 1α | TiO$_2$ | 63.2 | Silver | 50 | 52 | 4.5 | 100 | 92 nm 12 (13%) | 82 | 94 | 119 |
| Example 1c | Mica as per Ex. 1α | TiO$_2$ | 75.8 | Gold | 70 | | 4.5 | 77 | | | | |
| Example 1d | Mica as per Ex. 1α | TiO$_2$ | 78.4 | Red | 90 | 87 | 4.5 | 87 | | | | 115 |
| Example 1e | Mica as per Ex. 1α | TiO$_2$ | 82.1 | Blue | 130 | | 4.5 | 103 | | | | |
| Comparative example 1a | Mica 1β | TiO$_2$ | 52 | Silver | 50 | 38 | 6.2 | 158 | | | | 145 |
| Comparative example 1b | Mica 1β | TiO$_2$ | 67 | Gold | 70 | | 6.2 | 118 | 132 nm 18 (14%) | 118 | 133 | |
| Comparative example 1c | Mica 1β | TiO$_2$ | 69.3 | Orange | 80 | | 6.2 | 122 | | | | |
| Comparative example 1d | Mica 1β | TiO$_2$ | 72.4 | Red | 90 | 66 | 6.2 | 119 | | | | 155 |
| Comparative example 1e | Mica 1β | TiO$_2$ | 79 | Green | 150 | | 6.2 | 143 | | | | |
| Comparative example 2a | Mica (unknown) | TiO$_2$ | 49.3 | Silver | 50 | | 6.4 | 177 | 172 16 (9%) | — | — | |
| Comparative example 2b | | TiO$_2$ | 61.8 | Gold | 70 | | 6.4 | 149 | | | | |
| Comparative example 2c | | TiO$_2$ | 64.5 | Orange | 80 | | 6.4 | 153 | | | | |
| Comparative example 2d | | TiO$_2$ | 65.1 | Red | 90 | | 6.4 | 169 | | | | |
| Comparative example 2e | | TiO$_2$ | 68.1 | Violet | 110 | | 6.4 | 183 | | | | |
| Comparative example 2f | | TiO$_2$ | 71.8 | Blue | 130 | | 6.4 | 183 | | | | |
| Comparative example 2g | | TiO$_2$ | 73.8 | Green | 150 | | 6.4 | 193 | | | | |
| Comparative example 3 | Mica (unknown) | TiO$_2$ (Magna Pearl) | 49.3 | Silver | 50 | 34 | 5.2 | 179 | 179 | — | 130 | 129 |
| Example 2a | Mica Ex. 1α | Fe$_2$O$_3$ | 65.9 | Bronze | 40 | | 4.5 | 85 | 86 nm 6 (7%) | | | |
| Example 2b | | Fe$_2$O$_3$ | 71.7 | Copper | 50 | | 4.5 | 81 | | 82 | 94 | |
| Example 2c | | Fe$_2$O$_3$ | 76.4 | Fire-red | 60 | | 4.5 | 80 | | | | |
| Example 2d | | Fe$_2$O$_3$ | 75.6 | Red-violet | 70 | | 4.5 | 95 | | | | |
| Example 2e | | Fe$_2$O$_3$ | 79.5 | Scarab | 80 | | 4.5 | 87 | | 82 | 94 | |
| Comparative example 4a | Mica 1β | Fe$_2$O$_3$ | 59.7 | Bronze | 40 | | 6.2 | 109 | 119 nm 9 (8%) | 118 | 133 | |
| Comparative example 4b | | Fe$_2$O$_3$ | 62.4 | Copper | 50 | | 6.2 | 123 | | | | |
| Comparative example 4c | | Fe$_2$O$_3$ | 66.2 | Fire-red | 60 | 57.5 | 6.2 | 126 | | | | 177 |

Results of the Layer Thickness Determinations:

The average layer thickness of the substrate, $h_S$, independently of the method of determination, is significantly lower in all of the inventive examples than in the case of the comparative examples. In the inventive examples, accordingly, a finer and thinner mica was used than in the comparative examples.

In detail, however, certain systematic deviations become apparent in the results obtained by different methods. These will be briefly discussed below.

With regard to the values calculated by eq. 7, certain fluctuations of the samples are apparent within one example or comparative example. These fluctuations probably originate primarily from the measurement errors in the determination of the metal oxide content, the assumptions concerning the metal oxide layer thickness (via the shade), and the measurement errors in the determination of the average particle size.

Always, however, the average substrate layer thickness $h_S$ for the inventive examples (mica 1α) is below 110 nm.

If, however, the average values of $h_S$ within a series of the examples or comparative examples (column 10) are compared with one another, for the inventive examples 1 and 2 on the one hand (92 and 86 nm) and for the comparative examples 1 and 4 on the other hand (138 and 119 nm), an outstanding agreement is found in each case. In examples 1 and 2, the muscovite mica 1α was used, and in comparative examples 1 and 4, the muscovite mica 1β was used in each case.

Furthermore, outstanding agreements are found for the values calculated by eq. 7 via the oxide contents and oxide layer thicknesses, with the average layer thicknesses found in accordance with the evaluation of the vertically oriented powders of the mica (column 11) and of the mica in the knife drawdown.

These findings suggest the consistency of the model of eq. 1-7 and the reliability of the determination of the average layer thickness by this method.

The determination of the average layer thickness of the mica from the cross sections (column 12) systematically shows higher values in comparison to the determination on vertically oriented powders. This is probably attributable essentially to two factors:

Mica has a somewhat lower thickness at the margin than in the center. Therefore, the values according to the powder method may potentially be somewhat too low. The pigments of the cross section method have somewhat different orientations of the platelets within the varnish. As stated above, this leads to apparently higher values.

The determination of the average layer thickness $h_S$ from the cross sections of the pearlescent pigments (column 12) themselves leads to values which potentially are higher still (column 12).

Therefore, in the context of this invention, the average substrate layer thickness is ascertained preferably by eq. 7 when the layer thicknesses of the optically active layer are 40 nm to 180 nm.

Plotted in FIG. 2 is the amount of $TiO_2$ or $Fe_2O_3$ for the inventive examples and comparative examples, in the form of a "series". Also plotted are the curves calculated by eq. (6) with the data from tab. 3 (averages of column 10 for the substrate height). A good fit is apparent between the experimental data and the calculated curves.

II Tests:

IIa Angle-Dependent Lightness Measurements

In order to characterize the reflective scattered-light fraction, the pigment was incorporated with stirring, at a level of pigmentation of 6% by weight (based on the total weight of the wet varnish, into a conventional nitrocellulose varnish (Dr. Renger Erco Bronzemischlack 2615e; from Morton). The effect pigment was introduced and then dispersed into the varnish with a brush.)

The completed varnish was applied, on a knife drawdown apparatus with a wet film thickness of 50 μm, to #2853 test charts from Byk Gardner (contrast paper).

Using a multi-angle colorimeter, M 682 from X-Rite, the L* and C* values were determined with a constant incident angle of 45° (as per manufacturer specifications) with different observation angles relative to the specular angle. Particularly relevant are the observation angles at 15°, 25°, 45° and 110°.

Strongly reflecting samples (ideal mirror case) reflect virtually the entire incident light at what is called the specular angle. Accordingly, the greater the distance from the specular angle in the measurement, the less the light and hence the lightness (L*) that can be measured. Within the coatings industry, this effect, which occurs preferentially with metallic pigments, is described as lightness flop.

The situation is different with strongly scattering samples. Here, the incident light is reflected, ideally uniformly, over all angles. Accordingly, considerable lightness values ought still to be detectable even at measurement angles far removed from the specular angle. Suitable above all for the characterization here is the 110° angle.

IIb Gloss Measurements:

The scattering nature of the respective sample can be characterized additionally through the measurement of the gloss. The gloss is a measure of the directed reflection. Strongly scattering samples, therefore, ought to have a low gloss.

The nitrocellulose varnish applications from IIa were subjected to measurement using a micro-tri-gloss gloss meter from Byk Gardner with a measurement angle of 60° (for samples with weak gloss) and with a black background.

IIc Angle-Dependent Color Measurements

In addition to the light scattering, an additional color effect is desired as well, in order to intensify the complexion of the skin.

For the measurement of the chroma, the procedure described under IIa was repeated, and the chroma close to the specular angle at 25° has been listed in table 4.

II d Opacity

Some samples of the inventive pigments and of the comparative examples were knife-coated at different concentrations onto contrast cards, and the opacity was compared visually. This opacity was assessed on the basis of the following ratings:

1=very poor
2=poor
3=moderate
4=good
5=very good

TABLE 4

Results of the optical measurements and opacity

| Interference color | Sample | Chroma 25° | Opacity (visual) | L 110° | Gloss 60° |
|---|---|---|---|---|---|
| pale blue | Example 1a | 23.3 | 3 | 25.8 | 7.1 |
| silver | Example 1b | 10.3 | 4 | 38.8 | 9.9 |
| red | Example 1d | | 4 | | |
| blue | Example 1e | 31.1 | 4 | 37.0 | 6.1 |
| green | Example 1f | 21.0 | 4 | 38.9 | 7.3 |
| bronze | Example 2a | 33.5 | 5 | 22.6 | 11.6 |
| copper | Example 2b | 40.2 | 5 | 18.7 | 9.9 |
| silver | / | 14.3 | 4 | 22.4 | 21.5 |
| silver | Comp. Ex. 1a | 9.4 | 2 | 31.9 | |
| red | Comp. Ex. 1d | 22.3 | 2 | 28.0 | 11.0 |
| bronze | Comp. Ex. 4a | 37.3 | 3 | 16.0 | 17.9 |
| copper | Comp. Ex. 4b | 40.1 | 3 | 14.6 | 15.1 |
| silk blue | Comp. Ex. 5e | 29.7 | 2 | 21.7 | 17.3 |
| silk green | Comp. Ex. 5f | 16.2 | 2 | 22.5 | 27.3 |
| Magna Pearl 3100(silver) | Comp. Ex. 3 | 10.6 | 3 | 31.7 | 11.8 |
| bronze | Comp. Ex. 2a | 28.4 | 2 | 16.5 | 16.1 |
| copper | Comp. Ex. 2b | 32.9 | 2 | 15.0 | 15.1 |

The pearlescent pigments of the invention have a consistently better opacity than the comparative examples from the prior art. In this context it is always necessary to compare the corresponding shades.

Furthermore, the pigments of the inventive examples exhibit a lower gloss than the comparative examples of each corresponding shade. The directed reflection here is evidently lower. This is entirely desirable for a soft-focus effect.

In the same way, the $L_{110}°$ values for the inventive examples are substantially higher than for the corresponding comparative examples. The measurements show that the inventive examples evidently have a higher scattered-light fraction.

This is probably attributable to the low particle size and the low substrate layer thickness. The low particle size of the mica goes hand in hand with an increased edge fraction and hence with greater scattering. The lower substrate layer thickness leads in turn to a substantially increased $TiO_2$ content at comparable layer thickness. The high-index $TiO_2$ commonly does not fall into a perfect smooth layer, but instead always has a certain particle size distribution. These oxide particles always give rise to a certain scattering. It is thought that the higher scattered-light fraction of the samples according to the invention is also attributable to this effect.

Completely surprising, however, is the fact that the chroma of the colored samples of the inventive pigments is comparable with or even greater than that of the corresponding comparative examples. This is not anticipated by the skilled person when the pigments have a stronger scattered-light fraction. The normal expectation would be that, in this case, the chroma would drop, owing to the increased white-light base.

Accordingly, the pearlescent pigments of the invention have new, surprising optical properties.

II e UV Absorption Measurements

UV absorption measurements were carried out on a number of samples. Comparison in each case was between the corresponding samples with a comparable interference color.

The absorption of the individual pearlescent pigments was measured using a Genesys 20, Helios ε UV-vis spectrometer from Thermo.

In this case, the pigment was stirred using a magnetic stirrer into a glycerol/water mixture (ratio 90:10) at 0.025% by weight, and then subjected to measurement from a quartz cuvette with an optical path length of 10 mm.

Figure 3B:
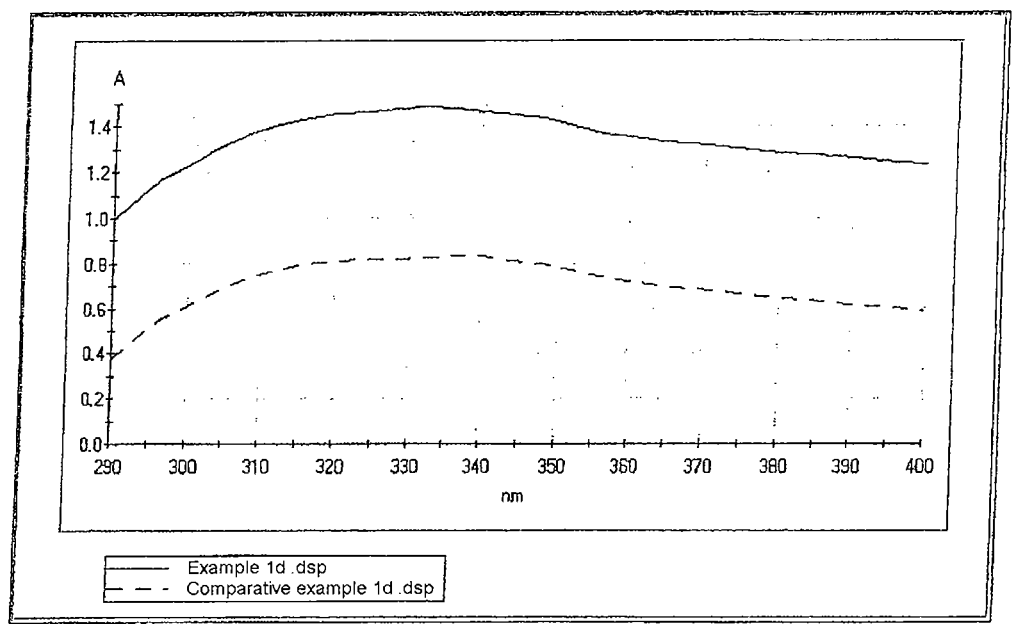

FIGS. 3a and 3b show the absorption spectra in the wavelength range from 290 to 400 nm. The samples according to the invention (FIG. 3a: example 1b and FIG. 3b: example 1d) always exhibit a significantly higher absorption than the respectively used pigments of the comparative examples indicated.

II f Measurement of the Soft-Focus Effect

Subsequently, the pigments of the invention were characterized in comparison to commercial pigments with soft-focus effect. For this purpose, the pigments were incorporated with stirring, at a level of pigmentation of 2.5% by weight (based on the total weight of the wet varnish), into a conventional nitrocellulose varnish (Dr. Renger Erco Bronzemischlack 2615e; from Morton). The effect pigment was introduced and then dispersed into the varnish using a brush.

The completed varnish was applied using a knife drawdown apparatus with a wet film thickness of 50 μm to commercially available transparent PET films, e.g., Hostophan®.

The films coated in this way were subjected to measurement for total transmission and haze using the Haze-gard plus from Byk Gardner, Geretsried. The haze is a product of what is called the large-angle scattering (according to ASTM D 1003, the haze is the amount of light which deviates on average by more than 2.5° from the incident light beam—measured in %).

Figure 4:
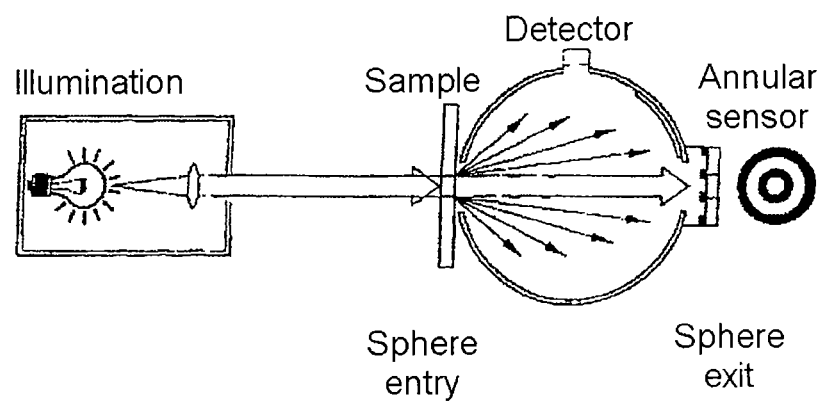
FIG. 4 is a schematic representation of a measurement apparatus for total transmission and haze as described herein.

The measurement principle can be taken from FIG. 4.

A light bundle impinges on the sample and enters into an integrating sphere. The inside wall of the sphere has a matt white coating, in order to guarantee uniform distribution of the light. A detector in the sphere measures the total transmission with the sphere exit closed, and the haze with the sphere exit open.

In order to measure the directed reflection, the gloss of the respective films was determined using a micro-gloss instrument from Byk Gardener at an angle of 60° C.

TABLE 5

Measurement of the soft-focus effect:

| Specimens | Transmission | Haze (% at >2.5°) | Gloss |
|---|---|---|---|
| Comparative Ex. 1a | 71.4 | 63.8 | 40.3 |
| Comparative Ex. 1d | 86.6 | 56.9 | 43.1 |
| Example 1d | 85.9 | 71.2 | 33.3 |
| Example 1b | 73.1 | 72.7 | 29.1 |
| Comparative Ex. 6a | 85.6 | 36.6 | 71.5 |
| Comparative Ex. 6b | 89.3 | 27.1 | 87.7 |

The measurement values from table 5 show that the pigments of the invention possess a comparably high transmittance. At the same time, however, these pigments also have a very high scattered-light fraction (haze).

The directed reflection (gloss) on the other hand, is much lower than that of the comparative examples.

In the combination of properties, the pigments of the invention meet substantial requirements for achieving a soft-focus effect in application. They are substantially more suitable for forming a soft-focus effect than the respective comparison specimens.

In addition, the pigments claimed, in contrast to commercial soft-focus particles, combine the properties of a soft-focus pigment with those of a pearlescent pigment (interference shades, satin gloss).

What is claimed is:

1. Pearlescent pigments, each pearlescent pigment in the pearlescent pigments comprising a largely transparent platelet-shaped substrate and at least one optically active coating, wherein the platelet-shaped substrates in the pearlescent pigments have a $d_{50}$ of 3 to 8 μm and an average height $h_S$ of 40 to 110 nm, and wherein a standard deviation for the height $h_S$ of each said substrate is in a range of from 25% to 80%.

2. The pearlescent pigments of claim 1, wherein the average height $h_S$ is 40 nm to less than 100 nm.

3. The pearlescent pigments of claim 1, wherein the pearlescent pigments have a size distribution with a $d_{90}$ value of 7.0 to 11.0 μm.

4. The pearlescent pigments of claim 1, wherein the optically active coating is a high-index coating.

5. The pearlescent pigments of claim 1, wherein the optically active layer comprises at least one of a metal oxide layer, a metal hydroxide layer and a metal oxide hydrate layer.

6. The pearlescent pigments of claim 5, wherein the metal oxide layer comprises at least one metal oxide selected from the group consisting of titanium oxide, iron oxide, cerium oxide, chromium oxide, tin oxide, zirconium oxide, cobalt oxide, and mixtures thereof.

7. The pearlescent pigments of claim 5, wherein the layer thickness of the metal oxide layer is between 10 and 300 nm.

8. The pearlescent pigments of claim 6, wherein the metal oxide layer consists of $TiO_2$ and the substrate consists of mica, and the relationship between the $TiO_2$ content in % by weight, based on the total weight of $TiO_2$ and mica, and the average layer thickness of the $TiO_2$ coating is selected from the group consisting of a TiO$_2$ content of 47.5-62% by weight with an average TiO$_2$ layer thickness of above 20 to 30 nm;
a TiO$_2$ content of 58-74% by weight with an average TiO$_2$ layer thickness of above 35 to 45 nm;
a TiO$_2$ content of 63-78% by weight with an average TiO$_2$ layer thickness of above 45 to 55 nm;
a TiO$_2$ content of 67-82% by weight with an average TiO$_2$ layer thickness of above 55 to 65 nm;
a TiO$_2$ content of 70-85% by weight with an average TiO$_2$ layer thickness of above 65 to 75 nm;
a TiO$_2$ content of 73.5-86.5% by weight with an average TiO$_2$ layer thickness of above 75 to 85 nm;
a TiO$_2$ content of 75-88% by weight with an average TiO$_2$ layer thickness of above 85 to 95 nm;
a TiO$_2$ content of 76.5-89% by weight with an average TiO$_2$ layer thickness of above 95 to 105 nm;
a TiO$_2$ content of 78.5-90% by weight with an average TiO$_2$ layer thickness of above 105 to 115 nm;
a TiO$_2$ content of 80-91% by weight with an average TiO$_2$ layer thickness of above 115 to 125 nm;
a TiO$_2$ content of 81.5-92% by weight with an average TiO$_2$ layer thickness of above 125 to 135 nm;
a TiO$_2$ content of 83-92.5% by weight with an average TiO$_2$ layer thickness of above 135 to 145 nm;
a TiO$_2$ content of 84-93% by weight with an average TiO$_2$ layer thickness of above 145 to 155 nm;
a TiO$_2$ content of 85-93% by weight with an average TiO$_2$ layer thickness of above 155 to 165 nm;
a TiO$_2$ content of 86-93.5% by weight with an average TiO$_2$ layer thickness of above 165 to 175 nm;
a TiO$_2$ content of 87-94% by weight with an average TiO$_2$ layer thickness of above 175 to 185 nm;
a TiO$_2$ content of 87.5-94% by weight with an average TiO$_2$ layer thickness of above 185 to 195 nm;
a TiO$_2$ content of 88-94.5% by weight with an average TiO$_2$ layer thickness of above 195 to 205 nm; and
a TiO$_2$ content of 89-95% by weight with an average TiO$_2$ layer thickness of above 205 to 215 nm.

9. The pearlescent pigments of claim 6, wherein the metal oxide layer consists of TiO$_2$ (largely in the rutile modification), and the substrate consists of mica, and the relationship between the TiO$_2$ content in % by weight, based on the total weight of TiO$_2$ and mica, and the average layer thickness of the TiO$_2$ coating is selected from the group consisting of
a TiO$_2$ content of 50.5-62% by weight with an average TiO$_2$ layer thickness of above 20 to 30 nm;
a TiO$_2$ content of 61-74% by weight with an average TiO$_2$ layer thickness of above 35 to 45 nm;
a TiO$_2$ content of 65.5-78% by weight with an average TiO$_2$ layer thickness of above 45 to 55 nm;
a TiO$_2$ content of 69.5-82% by weight with an average TiO$_2$ layer thickness of above 55 to 65 nm;
a TiO$_2$ content of 72.5-85% by weight with an average TiO$_2$ layer thickness of above 65 to 75 nm;
a TiO$_2$ content of 75-86.5% by weight with an average TiO$_2$ layer thickness of above 75 to 85 nm;
a TiO$_2$ content of 77.5-88% by weight with an average TiO$_2$ layer thickness of above 85 to 95 nm;
a TiO$_2$ content of 79-89% by weight with an average TiO$_2$ layer thickness of above 95 to 105 nm;
a TiO$_2$ content of 80.5-90% by weight with an average TiO$_2$ layer thickness of above 105 to 115 nm;
a TiO$_2$ content of 82-91% by weight with an average TiO$_2$ layer thickness of above 115 to 125 nm;
a TiO$_2$ content of 83-92% by weight with an average TiO$_2$ layer thickness of above 125 to 135 nm;
a TiO$_2$ content of 84.5-92.5% by weight with an average TiO$_2$ layer thickness of above 135 to 145 nm;
a TiO$_2$ content of 85.5-93% by weight with an average TiO$_2$ layer thickness of above 145 to 155 nm;
a TiO$_2$ content of 86.5-93% by weight with an average TiO$_2$ layer thickness of above 155 to 165 nm;
a TiO$_2$ content of 87-93.5% by weight with an average TiO$_2$ layer thickness of above 165 to 175 nm;
a TiO$_2$ content of 88-94% by weight with an average TiO$_2$ layer thickness of above 175 to 185 nm;
a TiO$_2$ content of 88.5-94% by weight with an average TiO$_2$ layer thickness of above 185 to 195 nm;
a TiO$_2$ content of 89-94.5% by weight with an average TiO$_2$ layer thickness of above 195 to 205 nm; and
a TiO$_2$ content of 89.5-95% by weight with an average TiO$_2$ layer thickness of above 205 to 215 nm.

10. The pearlescent pigments of claim 1, wherein the transparent platelet-shaped substrate is selected from the group consisting of mica, synthetic mica, glass flakes, SiO$_2$ platelets, Al$_2$O$_3$ platelets, and mixtures thereof.

11. The pearlescent pigments of claim 10, wherein the largely transparent platelet-shaped substrate consists of mica, glass flakes or mixtures thereof.

12. The pearlescent pigments of claim 1, wherein the pearlescent pigments have at least one further layer having a refractive index <2.0.

13. The pearlescent pigments of claim 1, wherein the pearlescent pigments have at least one further protective layer on the optically active layer.

14. The pearlescent pigments of claim 13, wherein the at least one further protective layer comprises at least one metal oxide layer whose metal oxides are selected from the group consisting of SiO$_2$, Al$_2$O$_3$, cerium oxide, mixtures thereof and combinations thereof.

15. A method for producing the pearlescent pigments of claim 1, wherein the method comprises the following steps:
a) classifying the largely transparent substrate, to give a substrate having an average height h$_S$ of 40 to 110 nm; and
b) coating the classified substrate with an optically active layer, to form a pearlescent pigment having an average size d$_{50}$ of 3 to 8 µm.

16. A method for producing a material selected from the group consisting of paints, printing inks, cosmetics, plastics, glass, enamel and ceramic wherein the method comprises adding to said material the pearlescent pigments of claim 1.

17. The method of claim 16, wherein the cosmetics are selected from the group consisting of concealer sticks, body powder, face powder, compact and loose powder, face makeup, powder cream, cream makeup, emulsion makeup, wax makeup, foundation, mousse makeup, blusher, eye makeup, lipcare sticks, lipsticks, lip gloss, lip liners, hairstyling compositions, hair-setting products, hair mousse, hair gel, hair wax, hair mascara, permanent and semipermanent hair colors, temporary hair colors, skincare compositions, and nail varnish compositions.

18. A method for producing soft-focus pigment comprising forming a pearlescent pigment by a method according to claim 15.

19. A coating composition comprising one of the pearlescent pigments of claim 1.

20. The pearlescent pigments of claim 4, wherein the high-index coating has a refractive index n$_M$>2.0.

21. The pearlescent pigments of claim 8, wherein the TiO$_2$ is in the rutile modification.

22. The pearlescent pigments of claim 13, wherein the at least one further protective layer is a high index layer.

23. The method of claim 15, wherein the optically active layer has a high index.

24. The coating composition of claim 19, wherein the composition is a cosmetic product.

25. The pearlescent pigments of claim 1, wherein the $d_{50}$ is based on laser diffraction measurements.

* * * * *